US008924088B2

(12) United States Patent
Mase et al.

(10) Patent No.: US 8,924,088 B2
(45) Date of Patent: Dec. 30, 2014

(54) COLLISION DETECTION APPARATUS, COLLISION DETERMINATION METHOD, AND ACTIVATION CONTROL APPARATUS FOR OCCUPANT PROTECTION APPARATUS

(75) Inventors: Yusuke Mase, Okazaki (JP); Motomi Iyoda, Seto (JP); Tomoki Nagao, Nagoya (JP); Hiroyoshi Takeuchi, Oobu (JP); Suguru Taniguchi, Kobe (JP)

(73) Assignees: Toyota Jidosha Kabushiki Kaisha, Toyota-shi (JP); Denso Corporation, Kariya-shi (JP); Fujitsu Ten Limited, Kobe-shi (JP)

( * ) Notice: Subject to any disclaimer, the term of this patent is extended or adjusted under 35 U.S.C. 154(b) by 562 days.

(21) Appl. No.: 12/785,749

(22) Filed: May 24, 2010

(65) Prior Publication Data

US 2010/0312435 A1    Dec. 9, 2010

(30) Foreign Application Priority Data

May 22, 2009    (JP) ................................. 2009-124449

(51) Int. Cl.
| | | |
|---|---|---|
| *G06F 19/00* | (2011.01) | |
| *B60R 21/0132* | (2006.01) | |
| *B60R 21/00* | (2006.01) | |

(52) U.S. Cl.
CPC ..... *B60R 21/0132* (2013.01); *B60R 2021/0009* (2013.01); *B60R 2021/0006* (2013.01)
USPC .......................................................... 701/46

(58) Field of Classification Search
CPC ........................... B60R 21/01–21/0136; B60R 2021/0002–2021/0025; G01P 15/00–15/18; G01P 2015/00–2015/0882
USPC .......................................................... 701/46
See application file for complete search history.

(56) References Cited

U.S. PATENT DOCUMENTS

| | | | | |
|---|---|---|---|---|
| 6,157,880 A | * | 12/2000 | de Mersseman et al. | ....... 701/45 |
| 7,513,525 B2 | | 4/2009 | Ueno | |
| 8,145,386 B2 | | 3/2012 | Harase et al. | |
| 2009/0238657 A1 | * | 9/2009 | Brandt et al. | ................... 411/44 |
| 2010/0211251 A1 | | 8/2010 | Iyoda | |

FOREIGN PATENT DOCUMENTS

| | | | |
|---|---|---|---|
| JP | 2003-011772 A | | 1/2003 |
| JP | 2005-262966 A | | 9/2005 |
| JP | 2007-030766 A | | 2/2007 |
| JP | 2008-254734 A | | 10/2008 |
| JP | 2008254734 A | * | 10/2008 |
| JP | 2009090717 A | | 4/2009 |
| JP | 2009280061 A | | 12/2009 |
| JP | 2010228524 A | | 10/2010 |
| JP | 2011-131709 A | | 7/2011 |
| JP | 2011-195052 A | | 10/2011 |
| WO | 2008-059644 A1 | | 5/2008 |

OTHER PUBLICATIONS

Office Action issued on Jun. 22, 2012 in corresponding Japanese Application No. 2009-124449 and a partial English language translation thereof.

* cited by examiner

*Primary Examiner* — Jerrah Edwards
(74) *Attorney, Agent, or Firm* — Gifford, Krass, Sprinkle, Anderson & Citkowski, P.C.

(57) ABSTRACT

A collision detection apparatus that is mounted in a vehicle and that determines whether an object has collided with a side surface of the vehicle from outside the vehicle includes: an acceleration detection portion that detects acceleration in a transverse direction of the vehicle which is applied to a door portion of the vehicle from outside; an integration execution portion that starts integration of the acceleration detected by the acceleration detection portion and finds velocity by integrating the acceleration if the detected acceleration is greater than or equal to a pre-set positive first threshold value, or is less than or equal to a pre-set negative second threshold value; and a collision determination portion that determines whether an object has collided with a side surface of the vehicle based on the detected acceleration and the velocity found by the integration execution portion.

15 Claims, 14 Drawing Sheets

COLLISION DETECTION APPARATUS, COLLISION DETERMINATION METHOD, AND ACTIVATION CONTROL APPARATUS FOR OCCUPANT PROTECTION APPARATUS

INCORPORATION BY REFERENCE

The disclosure of Japanese Patent Application No. 2009-124449 filed on May 22, 2009 including the specification, drawings and abstract is incorporated herein by reference in its entirety.

BACKGROUND OF THE INVENTION

1. Field of the Invention

The invention relates to a collision detection apparatus that is, for example, mounted in a vehicle, and that determines whether an object has collided with a side surface of the vehicle from outside, and to a collision determination method therefore. Besides, the invention also relates to an activation control apparatus for an occupant protection apparatus which is, for example, mounted in a vehicle, and which determines whether an object has collided with a side surface of the vehicle from outside, and which controls activation of the occupant activation device.

2. Description of the Related Art

In order to appropriately protect an occupant of a vehicle by an occupant protection apparatus, such as an airbag or the like, which protects an occupant of a vehicle at the time of a collision of the vehicle, it is necessary to accurately determine whether the vehicle has collided. Therefore, various devices, methods, etc. for determining whether a vehicle has collided are described (e.g., see Japanese Patent Application Publication No. 2009-090717 (JP-A-2009-090717). A collision detection apparatus described in Japanese Patent Application Publication No. 2009-090717 (JP-A-2009-090717) determines whether a collision of an object with a door portion of the vehicle from outside has occurred on the basis of the direction and magnitude of the acceleration that occurs on the door portion, and the sign of the value obtained by integrating the acceleration that occurs on the door portion over a predetermined time.

According to the collision detection apparatus described in Japanese Patent Application Publication No. 2009-090717 (JP-A-2009-090717), it is possible to prevent false determination that an object has collided with a door portion of the vehicle from outside when the door portion is merely closed hard.

However, in the collision detection apparatus described in Japanese Patent Application Publication No. 2009-090717 (JP-A-2009-090717), when a vehicle is traveling on a rough road, or when a door portion is closed hard, or the like, there is possibility of occurrence of a delay in the timing of determining that an object has collided with the door portion of the vehicle from outside, due to effect of an integral of the acceleration that occurs on the door portion.

That is, the technology proposed in the collision detection apparatus described in Japanese Patent Application Publication No. 2009-090717 (JP-A-2009-090717), when an object collides with the door portion from outside, positive acceleration occurs, and the integral of acceleration (=the velocity) is a positive value, provided that the positive direction is defined as the direction from the outside of the door portion to the inside thereof. Therefore, if the acceleration that occurs on the door portion is greater than or equal to a pre-set positive threshold value, and the integral of acceleration (=the velocity) is positive, it is determined that an object has collided with the door portion from outside (see FIG. 14).

However, for example, in the case where an object collides with the door portion from outside while a negative value is found as an integral of acceleration (=a velocity), for example, during a travel of the vehicle on a rough road, it is not until the integral of acceleration (=the velocity) becomes positive that it is determined that an object has collided with the door portion from outside. Thus, there occurs a delay in the timing of determining that an object has collided with the door portion from outside (see FIG. 15).

SUMMARY OF THE INVENTION

The invention provides a collision detection apparatus and a collision determination method that are capable of accurately determining in an early period whether a collision with a door portion of a vehicle has occurred.

The invention relates to a collision detection apparatus that is mounted in a vehicle and that determines whether an object has collided with a side surface of the vehicle from outside the vehicle. This collision detection apparatus includes: an acceleration detection portion that detects acceleration in a transverse direction of the vehicle which is applied to a door portion of the vehicle from outside the vehicle; an integration execution portion that starts integration of the acceleration detected by the acceleration detection portion and finds velocity by integrating the acceleration if the acceleration detected by the acceleration detection portion is greater than or equal to a pre-set positive first threshold value, or is less than or equal to a pre-set negative second threshold value; and a collision determination portion that determines whether an object has collided with the side surface of the vehicle based on the acceleration detected by the acceleration detection portion and the velocity found by the integration execution portion.

According to this construction, the acceleration applied from outside in the direction to the outside of a door portion or to the inside of the door portion is detected. Besides, if the detected acceleration is greater than or equal to the pre-set positive first threshold value, or is less than or equal to the pre-set negative second threshold value, the integration of the detected acceleration is started, and velocity is found by integrating the acceleration. Furthermore, on the basis of the detected acceleration and the found velocity, it is determined whether an object has collided with a side surface of the vehicle. Therefore, it becomes possible to accurately determine occurrence of a collision with the door portion during an early period.

That is, since the integration of the detected acceleration is started when the detected acceleration is greater than or equal to the pre-set positive first threshold value, or is less than or equal to the pre-set negative second threshold value, the integration of the detected acceleration can be started at a proper timing by setting the first threshold value and the second threshold value at proper values. For example, if the first threshold value and the second threshold value are set at such proper values as to avoid the integration process from being started by the degree of the acceleration that can occur during a travel on a rough road, it does not happen that the integral of acceleration during a travel on a rough road causes adverse effect. Therefore, it becomes possible to accurately determine occurrence of a collision with a door portion of the vehicle in an early period.

A second aspect of the invention relates to an activation control apparatus for an occupant protection apparatus which is mounted in a vehicle, and which determines whether an object has collided with a side surface of the vehicle from outside, and which controls activation of the occupant protection apparatus. This activation control apparatus includes: an acceleration detection portion that detects acceleration in a transverse direction of the vehicle which is applied to a door portion of the vehicle from outside the vehicle; an integration execution portion that starts integration of the acceleration detected by the acceleration detection portion and finds velocity by integrating the acceleration if the acceleration detected by the acceleration detection portion is greater than or equal to a pre-set positive first threshold value, or is less than or equal to a pre-set negative second threshold value; a collision determination portion that determines whether an object has collided with the side surface of the vehicle based on the acceleration detected by the acceleration detection portion and the velocity found by the integration execution portion; and an activation prohibition portion that prohibits activation of the occupant protection apparatus if it is determined by the collision determination portion that an objected has not collided with the side surface of the vehicle.

According to this construction, the acceleration applied from outside in the direction to the outside of a door portion or to the inside of the door portion is detected. Besides, if the detected acceleration is greater than or equal to the pre-set positive first threshold value, or is less than or equal to the pre-set negative second threshold value, the integration of the detected acceleration is started, and velocity is found by integrating the acceleration. Furthermore, on the basis of the detected acceleration and the found velocity, it is determined whether an object has collided with a side surface of the vehicle. Moreover, if it is determined that a collision has not occurred, activation of the occupant protection apparatus is prohibited. Therefore, unnecessary operations of the occupant protection apparatus can be prevented.

That is, since the integration of the detected acceleration is started when the detected acceleration is greater than or equal to the pre-set positive first threshold value, or is less than or equal to the pre-set negative second threshold value, the integration of the detected acceleration can be started at a proper timing by setting the first threshold value and the second threshold value at proper values. For example, if the first threshold value and the second threshold value are set at such proper values as to avoid the integration process from being started by the degree of the acceleration that can occur during a travel on a rough road, it does not happen that the integration of acceleration during a travel on a rough road causes adverse effect. Therefore, it becomes possible to accurately determine occurrence of a collision with a door portion of the vehicle in an early period, whereupon unnecessary operations of the occupant protection apparatus can be prevented.

A third aspect of the invention relates to a collision determination method that determines whether an object has collided with a side surface of the vehicle from outside the vehicle. This collision determination method includes: detecting acceleration in a transverse direction of the vehicle which is applied to a door portion of the vehicle from outside the vehicle; starting integration of the detected acceleration and finding velocity by integrating the acceleration if the detected acceleration is greater than or equal to a pre-set positive first threshold value, or is less than or equal to a pre-set negative second threshold value; and determining whether an object has collided with the side surface of the vehicle based on the detected acceleration and the velocity.

BRIEF DESCRIPTION OF THE DRAWINGS

The features, advantages, and technical and industrial significance of this invention will be described below with reference to the accompanying drawings, in which like numerals denote like elements, and wherein.

DETAILED DESCRIPTION OF EMBODIMENTS

Hereinafter, embodiments of the collision detection apparatus, and the activation control apparatus for an occupant protection apparatus of the invention will be described with reference to the drawings. A collision detection apparatus in accordance with the invention is a collision detection apparatus that is mounted in a vehicle and that determines whether an object has collided with a side surface of the vehicle from outside. Besides, an activation control apparatus for an occupant protection apparatus in accordance with the invention is an activation control apparatus that is, for example, mounted in a vehicle, and that determines whether an object has collided with a side surface of the vehicle from outside, and accordingly controls activation of the occupant protection apparatus.

Figure 14:
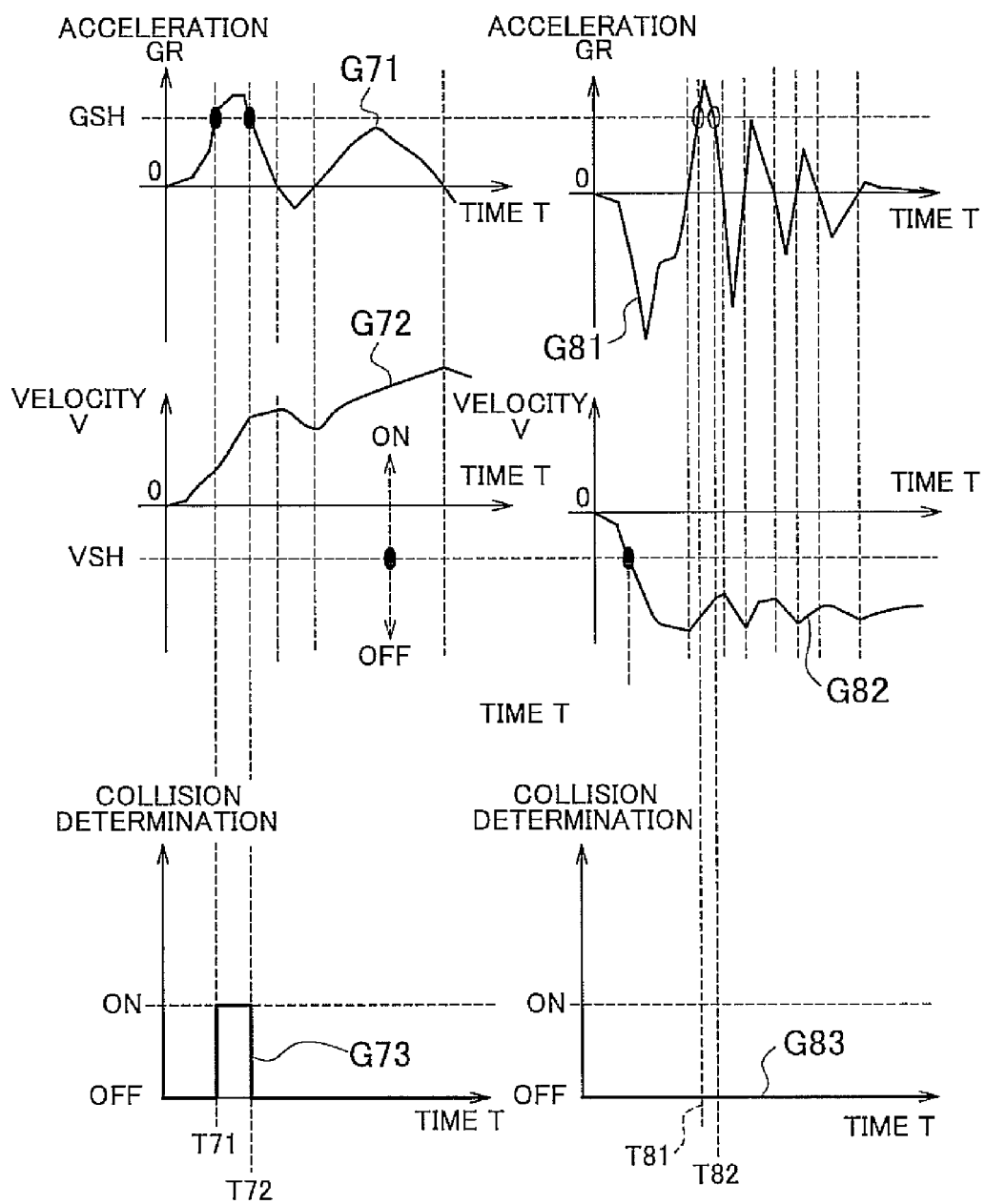
FIG. 14 is a graph showing an example of a collision determination in accordance with of a related art.

Firstly, with reference to FIGS. 14 and 15, a related-art collision determination method will be described as well as a problem to be solved by the invention. FIG. 14 shows graphs showing an example of the related-art collision determination method. Three diagrams on the left side in FIG. 14 show a case where an object collides with a side surface of a vehicle, and three diagrams on the right side show a case where a door is closed hard (which hereinafter will sometimes be referred to as "hard closure"). The graphs at the top are graphs G71 and G81 that show changes in acceleration GR. The graphs at an intermediate position are graphs G72 and G82 that show changes in the integral (velocity V) that is obtained by integrating the acceleration GR of the vehicle. The graphs at the bottom are graphs G73 and G83 that show results of determination as to whether a collision has occurred.

The determination as to whether a collision has occurred is performed on the basis of acceleration GR and velocity V. Concretely, it is determined that a collision has occurred, if the acceleration GR is greater than or equal to a pre-set threshold value GSH and the velocity V is greater than or equal to a pre-set threshold value VSH. For the sake of convenience in description herein, it is assumed that a collision determination being "ON" shows that it is determined that a collision has occurred, and the collision determination being "OFF" shows that it is determined that a collision has not occurred.

As shown in the left-side diagrams in FIG. 14, in the case where an object has collided with a side surface of the vehicle, the acceleration GR is greater than or equal to the threshold value GSH during a period from a time point T71 to a time point T72 and the velocity V is greater than or equal to the threshold value VSH during the same period, whereupon it is determined that the vehicle has collided (i.e., the collision determination becomes "ON"). On the other hand, as shown in the right-side diagrams in FIG. 14, in the case where a door is closed hard, the acceleration GR becomes greater than or equal to the threshold value GSH during a period from a time point T81 to a time point T82 but the velocity V is less than the threshold value VSH during the same period, whereupon it is not determined that the vehicle has collided (i.e., the collision determination does not become "ON").

Figure 15:
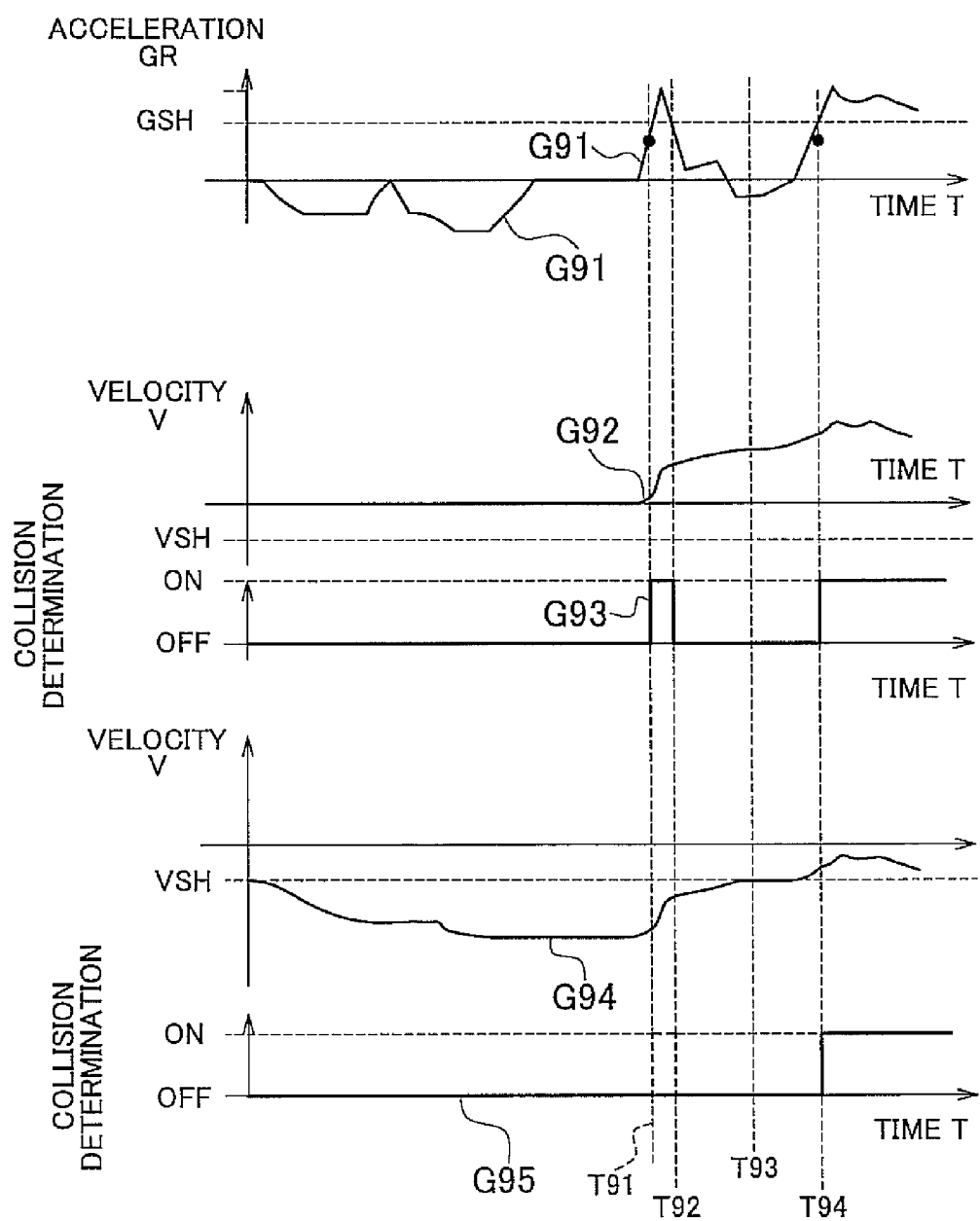
FIG. 15 is a graph illustrating an example of a problem to be solved by the invention.

FIG. 15 is a graph showing an example of a problem to be solved by the invention. FIG. 15 shows, in order from the top to the bottom, a graph G91 showing changes in the acceleration GR in the case where a collision occurs during a travel on a rough road, a graph G92 showing changes in the velocity V in the case where a collision occurs during a travel on a flat road, a graph G93 showing results of collision determination in the case where a collision occurs during a travel on a flat road, a graph G94 showing changes in the velocity V in the case where a collision occurs during a travel on a rough road, and a graph G95 showing results of the collision determination in the case where a collision occurs during a travel on a rough road.

In the case where a collision occurs during a travel on the flat road, the acceleration GR is greater than or equal to the threshold value GSH during a period from a time point T91 to a time point T92 as shown in the graph G91 and the velocity V is greater than or equal to the threshold value VSH during the same period as shown in the graph G92, whereupon it is determined that the vehicle has collided as shown in the graph G93 (i.e., the collision determination is "ON").

On the other hand, in the case where a collision occurs during a travel on the rough road, the acceleration GR is greater than or equal to the threshold value GSH during the period from the time point T91 to the time point T92 as shown in the graph G91 but the velocity V is less than the threshold value VSH during the same period as shown in the graph G94, whereupon it is not determined that the vehicle has collided as shown in the graph G95 (i.e., the collision determination is not "ON"). Then, at a time point T93, the velocity V reaches the threshold value VSH as shown in the graph G94. After that, during a period following a time point T94, the acceleration is greater than or equal to the threshold value GSH as shown in the graph G91 and the velocity V is greater than or equal to the threshold value VSH as shown in the graph G94, whereupon it is determined that the vehicle has collided as shown in the graph G95 (i.e., the collision determination is "ON").

That is, in the case where a collision occurs during the travel on the flat road, it is determined at the time point T91 that the vehicle has collided, whereas in the case where a collision occurs during the travel on the rough road, it is not determined at the time point T91 but is determined at the time point T94 that the vehicle has collided. That is, during the travel on the rough road, the timing of determining that an object has collided with a door portion of the vehicle from outside is delayed due to effect of integral of the acceleration GR (=velocity V) that occurs on the door portion.

Figure 1:
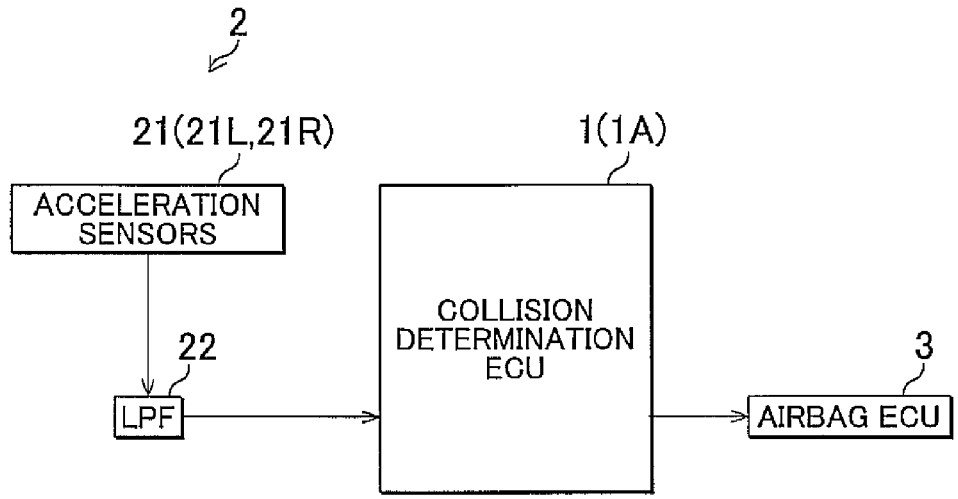
FIG. 1 is a block diagram showing an example of a construction of a collision detection apparatus and an activation control apparatus for an occupant protection apparatus in accordance with a first embodiment of the invention.

Next, with reference to FIGS. 1 and 2, an example of a construction of a collision detection apparatus, and an activation control apparatus for an occupant protection apparatus which are mounted in a vehicle will be described. FIG. 1 is a block diagram showing an example of a construction of a collision detection apparatus and an activation control apparatus for an occupant protection apparatus in accordance with the invention. As shown in FIG. 1, a collision determination ECU (electronic control unit) 1 in accordance with the invention (which corresponds to a collision detection apparatus, and an activation control apparatus for an occupant protection apparatus) is connected to input appliances 2 and an airbag ECU 3 so that the collision determination ECU is able to communication therewith.

Firstly, with reference to FIG. 1, the input appliances 2 of the collision determination ECU 1 will be described. The input appliances 2 include acceleration sensors 21 and a LPF (low-pass filter) 22.

The acceleration sensors 21 are acceleration sensors of a mechanical type, an optical type, a semiconductor type, etc., and detect the acceleration in a direction from the outside of the door toward the inside of the door as positive acceleration.

Figure 3:
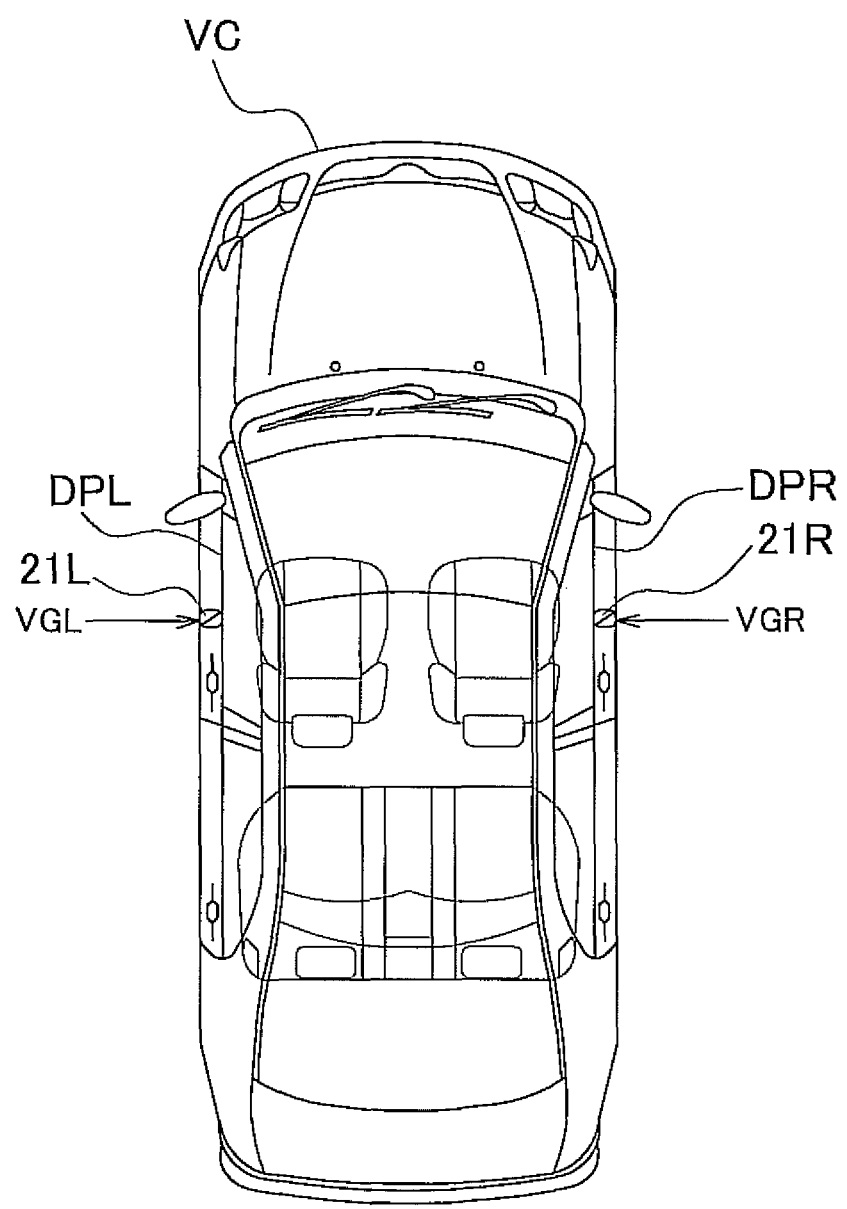
FIG. 3 is a transparent plan view of a vehicle showing an example of positions at which acceleration sensors are disposed.

FIG. 3 is a transparent plan view showing an example of positions at which the acceleration sensors 21 are disposed. The acceleration sensors 21R and 21L are disposed on inner panels DPL and DPR, respectively, in a vehicle VC. Besides, the acceleration sensors 21R and 21L are disposed between the inner panels DPL and DPR and outer panels of both-side doors. The acceleration sensors 21R and 21L each detect acceleration in the direction from the outside toward the inside of a corresponding one of the doors (in the direction of a corresponding one of a vector VGL and a vector VGR as shown in FIG. 3) as positive value.

Since the acceleration sensors 21 are disposed in the door panels in the foregoing manner, it is possible to accurately detect the acceleration GR while preventing damages to the acceleration sensors 21 from being caused by a collision.

This embodiment will be described in conjunction with the construction in which the acceleration sensors 21 are disposed on the door inner panels, it is also permissible to adopt a construction in which the acceleration sensors 21 are disposed at other positions. For example, each of the acceleration sensors 21 may be disposed on an inner side of a door outer panel. In this case, since either one of the door outer panels directly receives the impact of a collision (external force), the acceleration GR can be even more accurately detected.

Referring back to FIG. 1, the input appliance 2 will be described. The LPF 22 is a filter that removes high-frequency components from detection signals of the acceleration sensors 21. The LPF 22 is, for example, a filter that passes a signal that is at or below 75 Hz. The LPF 22 outputs an acceleration signal from which high-frequency components have been removed, to the collision determination ECU 1 (1A) (in this case, an acceleration detection portion 11 shown in FIG. 2 and FIG. 9).

The airbag ECU 3 (that corresponds to a portion of the occupant protection apparatus) controls airbags that are disposed at side surfaces (i.e., near doors) of the vehicle VC shown in FIG. 3. The airbag ECU 3 activates (i.e., deploys) the airbags on the basis of a command from the collision determination ECU 1, 1A (in this case, an activation control portion 17 shown in FIGS. 2 and 9).

This embodiment will be described in conjunction with the construction in which the occupant protection apparatus is airbags, it is also permissible to adopt a construction in which the occupant protection apparatus is of other kinds (e.g., an occupant protection apparatus that tightens a seatbelt, or the like).

Figure 2:
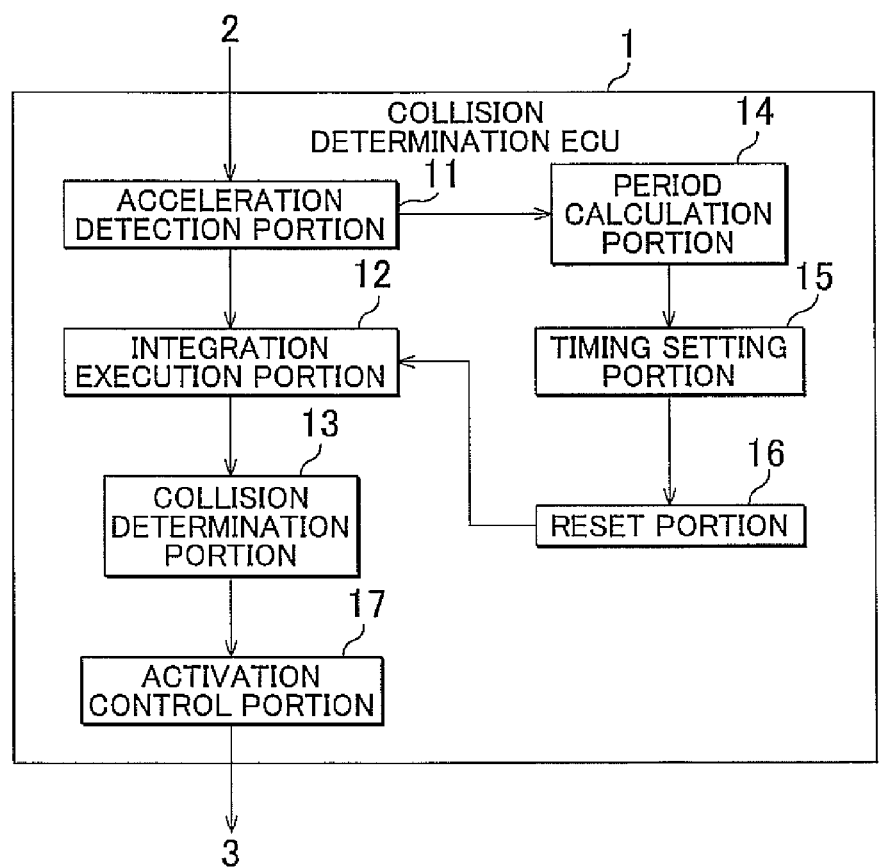
FIG. 2 is a block diagram showing an example of a functional construction of a collision determination ECU in accordance with the first embodiment.

FIG. 2 is a block diagram showing an example of a functional construction of the collision determination ECU 1 in accordance with the first embodiment. As shown in FIG. 2, the collision determination ECU 1 includes an acceleration detection portion 11, an integration execution portion 12, a collision determination portion 13, a period calculation portion 14, a timing setting portion 15, a reset portion 16, and an activation control portion 17.

Incidentally, the collision detection apparatus in accordance with the invention corresponds to the acceleration detection portion 11, the integration execution portion 12, the collision determination portion 13, the period calculation portion 14, the timing setting portion 15 and the reset portion 16 of the collision determination ECU 1. The activation control apparatus for an occupant protection apparatus in accordance with the invention corresponds to the acceleration detection portion 11, the integration execution portion 12, the collision determination portion 13, the period calculation portion 14, the timing setting portion 15, the reset portion 16 and the activation control portion 17 of the collision determination ECU 1.

Besides, the collision determination ECU 1 causes a microcomputer disposed at an appropriate location in the collision determination ECU 1 to function as the acceleration detection portion 11, the integration execution portion 12, the collision determination portion 13, the period calculation portion 14, the timing setting portion 15, the reset portion 16, the activation control portion 17, etc., by causing the microcomputer to execute control programs that are pre-stored in a ROM (read-only memory) or the like that is disposed at an appropriate location in the collision determination ECU 1.

The acceleration detection portion 11 detects acceleration GR that is applied to a collided door panel from outside in the direction toward the outside of the door portion or toward the inside of the door portion, via the acceleration sensors 21 and the LPF 22.

The integration execution portion 12 starts to integrate the acceleration GR detected by the acceleration detection portion 11 if the acceleration GR is greater than or equal to a pre-set positive first threshold value GSH1, or is less than or equal to a pre-set negative second threshold value GSH2. By integrating the acceleration GR, the integration execution portion 12 finds a velocity V.

The collision determination portion 13 determines whether an object has collided with a side surface of the vehicle VC on the basis of the acceleration GR detected by the acceleration detection portion 11 and the velocity V found by the integration execution portion 12. Concretely, the collision determination portion 13 determines that an object has collided with a side surface of the vehicle VC, only in the case where the acceleration GR detected by the acceleration detection portion 11 is greater than or equal to a pre-set positive third threshold value GSH3 and the velocity V found by the integration execution portion 12 is greater than or equal to a pre-set fourth threshold value VSH.

Figure 4:
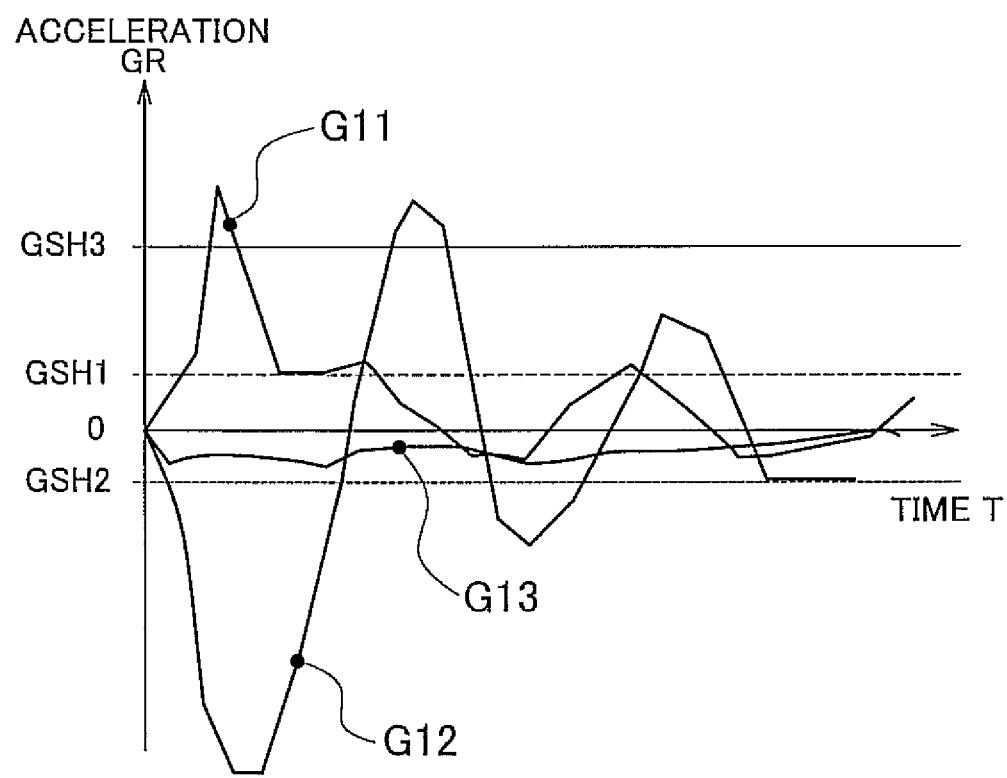
FIG. 4 is a graph showing an example of a method of setting a first threshold value GSH1, a second threshold value GSH2, and a third threshold value GSH3.

FIG. 4 is a graph showing an example of a method of setting the first threshold value GSH1 and the second threshold value GSH2 that are used as criteria by the integration execution portion 12 to determine whether to start integration, and the third threshold value GSH3 that is one of the threshold values that are used as criteria by the collision determination portion 13 to determine whether an object has collided with a side surface of the vehicle. In FIG. 4, the horizontal axis shows time T, and the vertical axis shows the acceleration GR detected by the acceleration detection portion 11.

A graph G11 shows an example of the acceleration GR that is detected by the acceleration detection portion 11 in the case where another vehicle collides with a vicinity of a door portion of the vehicle VC. A graph G12 shows an example of the acceleration GR that is detected by the acceleration detection portion 11 in the case where a door of the vehicle VC which is provided with an acceleration sensor 21 is closed hard. A graph G13 shows an example of the acceleration GR that is detected by the acceleration detection portion 11 while the vehicle VC is traveling on a rough road.

In order to prevent the integration execution portion 12 from starting the integration process during a travel of the vehicle VC on a rough road, the first threshold value GSH1 is set larger than the maximum value of the graph G13, and the second threshold value GSH2 is set smaller than the minimum value of the graph G13. Besides, the third threshold value GSH3 is set greater than or equal to the first threshold value GSH1, and smaller than the maximum value of the graph G11, in order to cause the collision determination portion 13 to accurately determine occurrence of a collision if a collision actually occurs.

Thus, since the first threshold value GSH1 and the second threshold value GSH2 are set at such proper values as to avoid the integration execution portion 12 from being caused to start the integration process by the degree of the acceleration GR that can occur during a travel on a rough road (see the graph G13 in FIG. 4), it does not happen that the integral of the acceleration GR during a travel on a rough road causes adverse effect. Therefore, it becomes possible to accurately determine occurrence of a collision with a door portion in an early period.

Incidentally, the fourth threshold value VSH that is another one of the threshold values that are used as criteria by the collision determination portion 13 to determine whether a collision has occurred is set as a negative value in this example, as described below with reference to FIGS. 5 and 6. As for the fourth threshold value VSH, the smaller the threshold value, the earlier the occurrence of a collision is determined, and the larger the threshold value, the more accurately the occurrence of a collision is determined (i.e., the more thoroughly the unnecessary operations of the airbag apparatus can be prevented). In this example, when a door is closed hard, the velocity V found by the integration execution portion 12 is negative in sign as described below with reference to FIGS. 5 and 6. During a travel on a rough road, the velocity V found by the integration execution portion 12 is negative in sign, as described below with reference to FIG. 15. Therefore, in this example, the fourth threshold value VSH is set as a negative value.

Referring back to FIG. 2, the functional construction of the collision determination ECU 1 will be described. The period calculation portion 14 finds the length of a low-acceleration period that is a period that satisfies the condition that the acceleration GR detected by the acceleration detection portion 11 continue to be less than the first threshold value GSH1 and be greater than the second threshold value GSH2.

The first embodiment will be described in conjunction with the case where the threshold values that prescribe the low-acceleration period are the same as the threshold values (the first threshold value GSH1 and the second threshold value GSH2) that are used as criteria by the integration execution portion 12 to determine whether to start the integration. However, the threshold values that prescribe the low-acceleration period may also be set at other values. As for the two threshold values that prescribe the low-acceleration period, the greater the upper threshold value is and the smaller the lower threshold value is, the earlier the timing of resetting the integral of acceleration (=the velocity V) can be made.

The timing setting portion 15 sets a reset timing that is a timing of resetting the value of the velocity V held by the integration execution portion 12, on the basis of the acceleration GR detected by the acceleration detection portion 11. Concretely, the timing setting portion 15 sets as the reset timing a timing at which the length of the low-acceleration period found by the period calculation portion 14 becomes equal to a pre-set period threshold value PSH.

The reset portion 16 resets to zero the value of the velocity V held by the integration execution portion 12, at the reset timing set by the timing setting portion 15.

Figure 5:
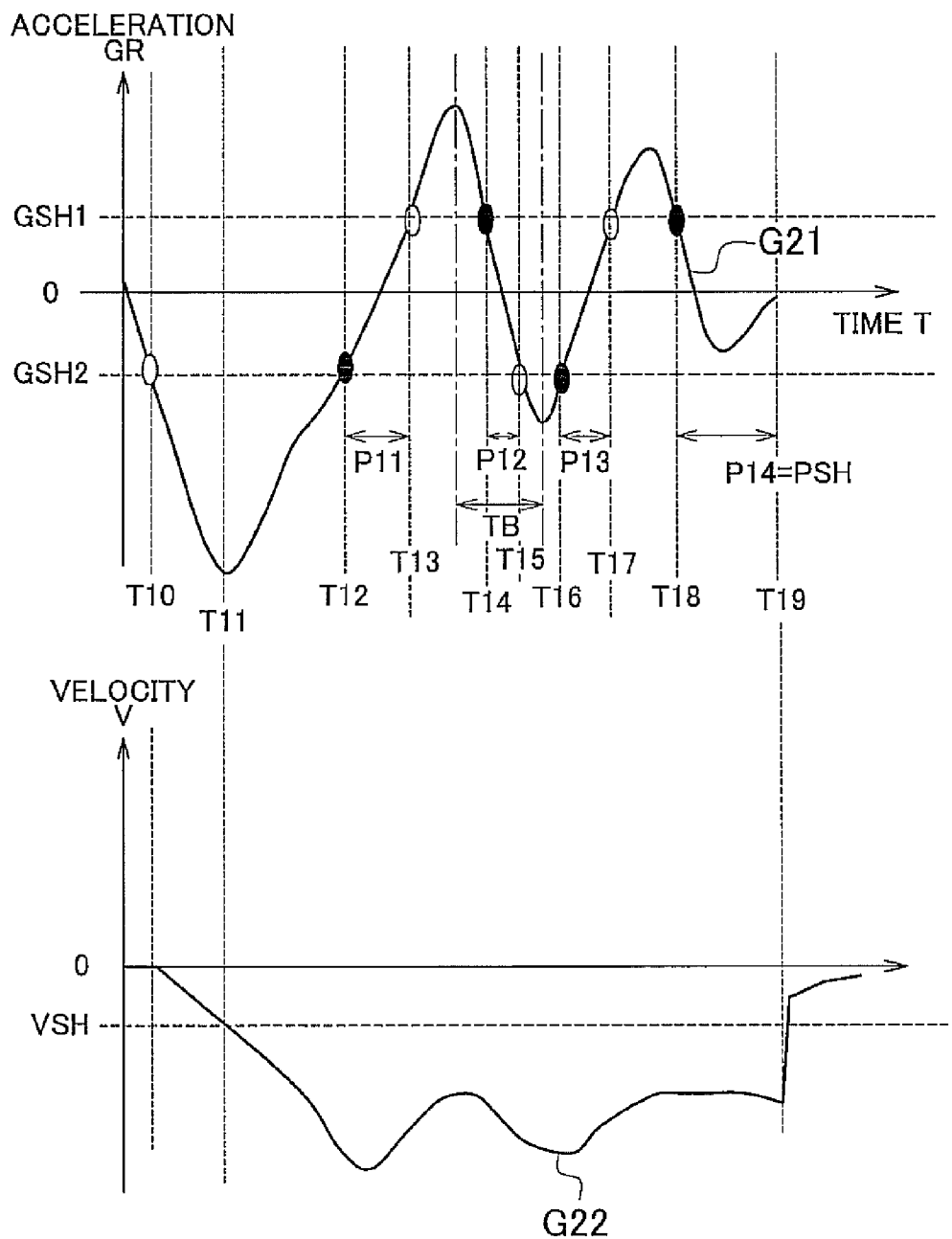
FIG. 5 is a graph showing an example of a timing of resetting an integral.
Figure 6:
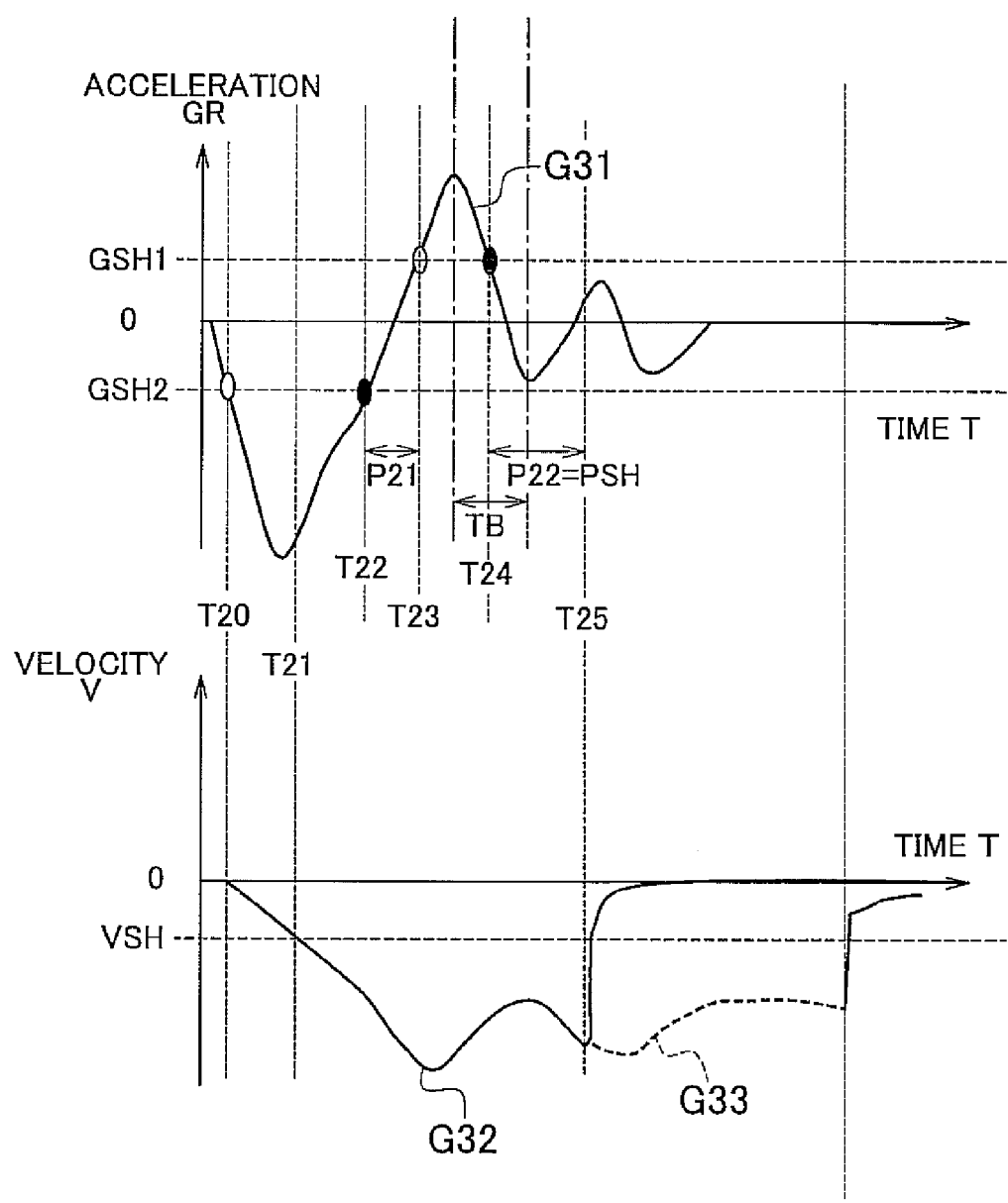
FIG. 6 is a graph showing another example of the timing of resetting an integral of acceleration.

FIGS. 5 and 6 are graphs showing an example of the reset timing at which the reset portion 16 resets the integral of acceleration (=the velocity V). FIGS. 5 and 6 show graphs showing the case where a door is closed hard. Upper graphs in FIGS. 5 and 6, that is, graphs G21 and G31, show the acceleration GR detected by the acceleration detection portion 11, and lower graphs, that is, graphs G22 and G32, show the integral of acceleration (=the velocity V) found by the integration execution portion 12. The horizontal axis in each graph shows time T.

As shown in FIG. 5, at a time point T10, the acceleration GR becomes less than or equal to the second threshold value GSH2, and therefore the integration execution portion 12 starts the integration process. Then, as shown in the lower diagram of FIG. 5, at a time point T11, the velocity V becomes less than or equal to the fourth threshold value VSH, and the activation control portion 17 prohibits the activation (=deployment) of the airbags. Furthermore, as shown in the upper diagram in FIG. 5, at a time point T12, the acceleration GR becomes greater than the second threshold value GSH2, whereupon the period calculation portion 14 finds the length of a low-acceleration period P11. At a time point T13, the acceleration GR becomes greater than or equal to the first threshold value GSH1, whereupon the low-acceleration period P11 ends. At this time, the integral is not reset, since the length of the low-acceleration period P11 is shorter than the period threshold value PSH.

Next, at a time point T14, the acceleration GR becomes less than the first threshold value GSH1, and the period calculation portion 14 finds the length of a low-acceleration period P12. At a time point T15, the acceleration GR becomes less than or equal to the second threshold value GSH2, whereupon the low-acceleration period P12 ends. At this time, since the length of the low-acceleration period P12 is shorter than the period threshold value PSH, the integral is not reset. Then, at a time point T16, the acceleration GR becomes greater than the second threshold value GSH2, and the period calculation portion 14 finds the length of a low-acceleration period P13. At a time point T17, the acceleration GR becomes greater than or equal to the first threshold value GSH1, whereupon the low-acceleration period P13 ends. At this time, since the length of the low-acceleration period P13 is shorter than the period threshold value PSH, the integral is not reset. Next, at a time point T18, the acceleration GR becomes less than the first threshold value GSH1, and the period calculation portion 14 finds the length of a low-acceleration period P14. At a time point T19, the length of the low-acceleration period P14 becomes equal to the period threshold value PSH, whereupon the integral is reset as shown by the lower diagram in FIG. 5. That is, as shown by the graph G22, the velocity V is reset to "0" at the time point T19.

Likewise, as shown by the upper diagram in FIG. 6, at a time point T20, the acceleration GR becomes less than or equal to the second threshold value GSH2, and the integration execution portion 12 starts an integration process. Then, as shown by the lower diagram in FIG. 6, at a time point T21, the velocity V becomes less than or equal to the fourth threshold value VSH, whereupon the activation control portion 17 prohibits the activation (i.e., deployment) of the airbag apparatus. Then, as shown by the upper diagram in FIG. 6, at a time point T22, the acceleration GR becomes greater than the second threshold value GSH2, whereupon the period calculation portion 14 finds the length of a low-acceleration period P21. At a time point T23, the acceleration GR becomes greater than or equal to the first threshold value GSH1, whereupon the low-acceleration period P21 ends. At this time, since the length of the low-acceleration period P21 is shorter than the period threshold value PSH, the integral is not reset.

Next, at a time point T24, the acceleration GR becomes less than the first threshold value GSH1, whereupon the period calculation portion 14 finds the length of a low-acceleration period P22. At a time point T25, the length of the low-acceleration period P22 becomes equal to the period threshold value PSH, whereupon the integral is reset as shown by the lower diagram in FIG. 6. That is, as shown by the graph G32, at the time point T25, the velocity V is reset to "0". Besides, the graph G33 shown by an interrupted line in the lower diagram in FIG. 6 shows changes in the integral of acceleration (=the velocity V) in the case where the integral is reset at the same timing as the reset timing in FIG. 5.

In this manner, during the low-acceleration period, which is a period that satisfies the condition that the detected acceleration GR continue to be less than the first threshold value GSH1 and be greater than the second threshold value GSH2, the level of the acceleration GR that is an external disturbance is low, and therefore it is possible to determine whether a collision with a door portion has occurred. However, there is possibility that an acceleration GR that is large in absolute value may be detected after the low-acceleration period. Since the times T19 and T25 at which the length of the low-acceleration period becomes equal to the pre-set period threshold value PSH are set as the reset timings, the reset timings can be set as an appropriate timing by setting the period threshold value PSH at an appropriate value (see FIGS. 5 and 6).

Although the first embodiment is described in conjunction with the case where the timing setting portion 15 sets the timing at which the length of the low-acceleration period becomes equal to the pre-set period threshold value PSH as the reset timing, it suffices that the timing setting portion 15 sets the reset timing on the basis of the low-acceleration period. For example, the timing setting portion 15 may also set as the reset timing a timing at which a pre-set length of period elapses following the time point at which the length of the low-acceleration period becomes equal to a pre-set period threshold value PSH.

Besides, for example, the timing setting portion 15 may set the reset timing on the basis of the value of the integral of acceleration (=the velocity V) at the timing at which the length of the low-acceleration period becomes equal to the pre-set period threshold value PSH. Concretely, the timing setting portion 15 may set the reset timing at a timing at which the length of the low-acceleration period becomes equal to the pre-set period threshold value PSH, only in the case where the absolute value of the integral of acceleration (=the velocity V) at the timing at which the length of the low-acceleration period becomes equal to the pre-set period threshold value PSH is greater than or equal to a pre-set threshold value. In this case, the frequency of resetting the integral of acceleration (=the velocity V) can be lessened.

Incidentally, the period threshold value PSH is set on the basis of a resonance period TB, as shown in FIGS. 5 and 6. The resonance period TB is measured as the time between the maximum acceleration GR peak and the subsequent minimum acceleration GR, as shown in FIGS. 5 and 6. In this example, the period threshold value PSH is set at 1.5 times the resonance period TB. Therefore, the reset timing of the integral of acceleration (=the velocity V) can be set at a proper timing (the reset timing is the time point T19 in FIG. 5, and the time point T25 in FIG. 6).

Although the first embodiment is described in conjunction with the case where the period threshold value PSH is set at 1.5 times the resonance period TB of the door inner panels of the vehicle VC, it suffices that the period threshold value PSH is set on the basis of the resonance period TB. For example, the period threshold value PSH may be set at 1.2 times the resonance period TB, or may also be set at 2.0 times the resonance period TB.

Referring back to FIG. 2, the functional construction of the collision determination ECU 1 will be described. The activation control portion 17 prohibits the airbag ECU 3 from activating (i.e., deploying) the airbag apparatus if it is determined by the collision determination portion 13 that a collision has not occurred. If the collision determination portion 13 determines that a collision has occurred, the activation control portion 17 commands the airbag ECU 3 to activate (=deploy) the airbag apparatus.

Figure 7:
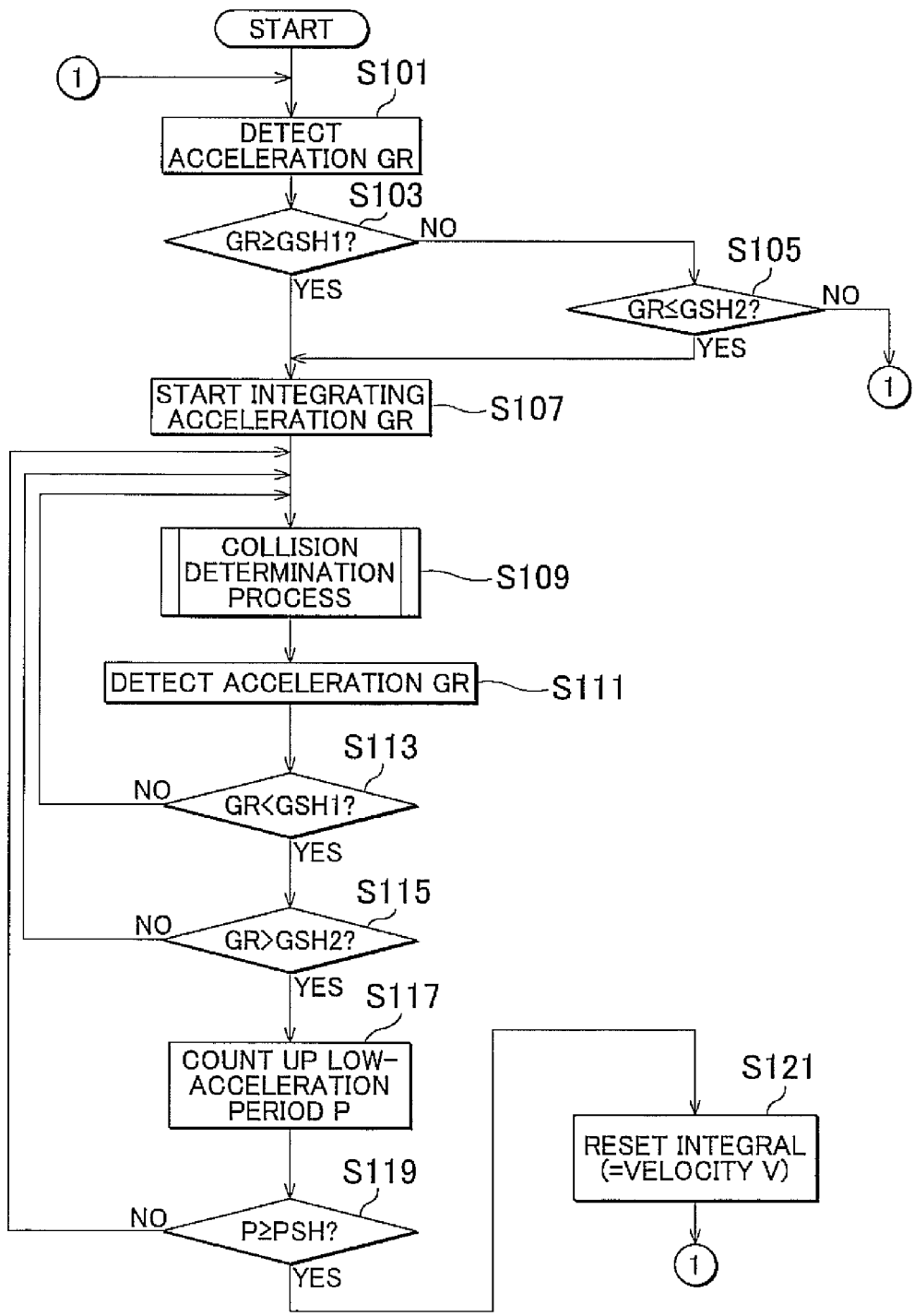
FIG. 7 is a flowchart showing an example of actions of the collision determination ECU in accordance with the first embodiment.

FIG. 7 is a flowchart showing an example of actions of the collision determination ECU 1 in accordance with the first embodiment. Firstly, the acceleration detection portion 11 of the ECU 1 detects the acceleration GR via the acceleration sensors 21 and the LPF 22 (S101). Then, the integration execution portion 12 of the ECU 1 determines whether the acceleration GR detected in step S101 is greater than or equal to the first threshold value GSH1 (S103). If it is determined that the acceleration GR is greater than or equal to the first threshold value GSH1 (YES in S103), the process proceeds to step S107. If it is determined that the acceleration GR is less than the first threshold value GSH1 (NO in S103), the integration execution portion 12 determines whether the acceleration GR detected in step S101 is less than or equal to the second threshold value GSH2 (S105). If it is determined that the acceleration GR is less than or equal to the second threshold value GSH2 (YES in S105), the process proceeds to step S107. If it is determined that the acceleration GR is greater than the second threshold value GSH2 (NO in S105), the process returns to step S101. Thus, the process starting with step S101 is repeated.

If the answer to step S103 is YES or if the answer to step S105 is YES, the integration execution portion 12 starts integrating the acceleration GR, and then finds an integral of acceleration (=a velocity V) (S107). Then, by the collision determination portion 13 and the like, a collision determination process of determining whether an object has collided with a side surface of the vehicle VC is performed (S109). Next, the acceleration detection portion 11 detects the acceleration GR via the acceleration sensors 21 and the LPF 22 (S111). Next, the period calculation portion 14 determines whether the acceleration GR detected in step S111 is less than the first threshold value GSH1 (S113). If it is determined that the acceleration GR is greater than or equal to the first threshold value GSH1 (NO in S113), the process returns to step S109. Thus, the process starting with step S109 is repeated. If it is determined that the acceleration GR is less than the first threshold value GSH1 (YES in S113), then the period calculation portion 14 determines whether the acceleration GR detected in step S111 is greater than the second threshold value GSH2 (S115). If it is determined that the acceleration GR is less than or equal to the second threshold value GSH2 (NO in S115), the process returns to step S109. Thus, the process starting with step S109 is repeated.

If it is determined that the acceleration GR is greater than the second threshold value GSH2 (YES in S115), the period calculation portion 14 starts counting the length of the low-acceleration period P (or counts up the length of the low-acceleration period P) (S117). Next, the timing setting portion 15 determines whether the length of the low-acceleration period P found in step S117 is greater than or equal to the period threshold value PSH (S119). If it is determined that the length of the low-acceleration period P is less than the period threshold value PSH (NO in S119), the process returns to step S109. Thus, the process starting with step S109 is repeated. If it is determined that the length of the low-acceleration period P is greater than or equal to the period threshold value PSH (YES in S119), the reset portion 16 resets to zero the value of the integral of acceleration (=the velocity V) held by the integration execution portion 12 (S121). Then the process returns to step S101. Thus, the process starting with step S101 is repeated.

Figure 8:
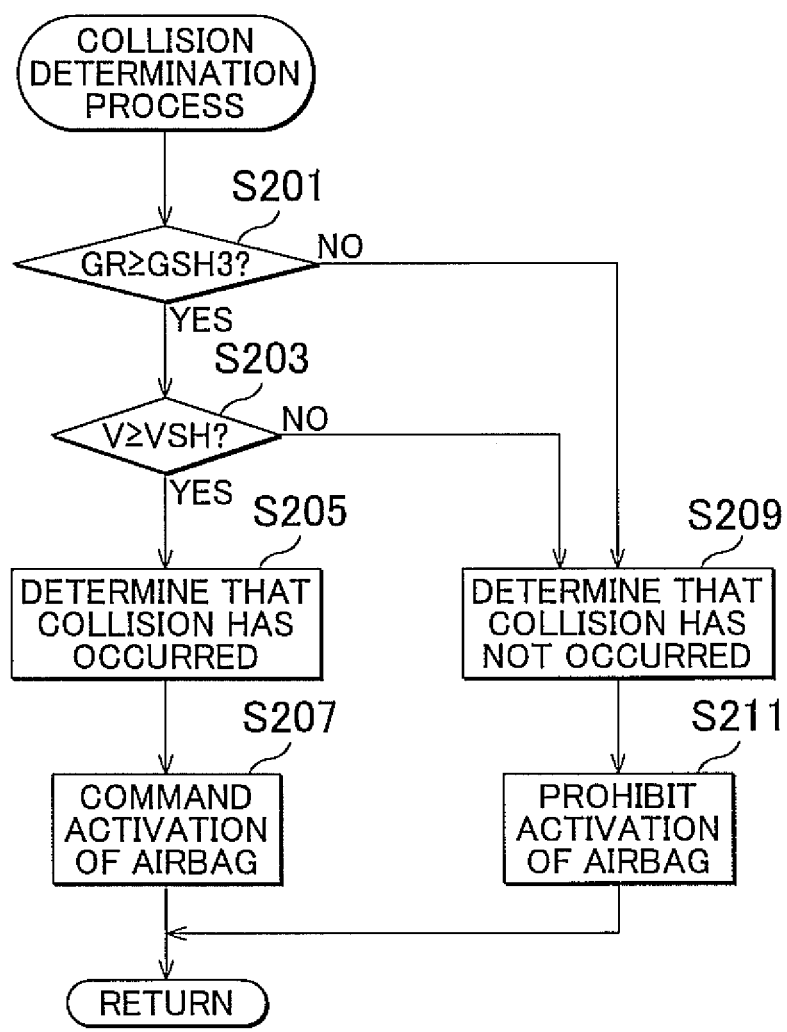
FIG. 8 is a flowchart showing an example of a collision determination process executed in step S109 in the flowchart shown in FIG. 7.

FIG. 8 is a flowchart showing an example of a collision determination process that is executed in step S109 in the flowchart shown in FIG. 7. The process described below is performed by the collision determination portion 13 unless otherwise specified. Firstly, it is determined whether the acceleration GR detected in step S101 in the flowchart shown in FIG. 7 is greater than or equal to the third threshold value GSH3 (S201). If it is determined that the acceleration GR is less than the third threshold value GSH3 (NO in S201), the process proceeds to step S211. If it is determined that the acceleration GR is greater than or equal to the third threshold value GSH3 (YES in S201), it is then determined whether the integral of acceleration (=the velocity V) found in step S107 in the flowchart shown in FIG. 7 is greater than or equal to the fourth threshold value VSH (S203). If it is determined that the velocity V is less than the fourth threshold value VSH (NO in S203), the process proceeds to step S209. If it is determined that the velocity V is greater than or equal to the fourth threshold value VSH (YES in S203), it is then determined that a collision has occurred (S205). Then, the activation control portion 17 commands the airbag ECU 3 to activate (i.e., deploy) the airbag apparatus (S207), and the process returns to step S111 shown in FIG. 7.

If the answer to step S203 is NO or if the answer to step S201 is NO, it is determined that a collision has not occurred (S209). Then, the activation control portion 17 prohibits the airbag ECU 3 from activating (i.e., deploying) the airbag apparatus (S211), and the process returns to step S111 shown in FIG. 7.

In this manner, if the detected acceleration GR is greater than or equal to the first threshold value GSH1 or is less than or equal to the second threshold value GSH2, the integration of the detected acceleration GR is started. Therefore, by setting the first threshold value GSH1 and the second threshold value GSH2 at proper values, the integration of the acceleration GR can be started at a proper timing. For example, if the first threshold value GSH1 and the second threshold value GSH2 are set at proper values such that the integration of the acceleration GR is not started when the acceleration is of a magnitude that can occur during a travel of a rough road, it does not happen that the integral of the acceleration GR during a travel on a rough road causes adverse effect (see FIG. 4). Therefore, it becomes possible to accurately determine in an early period whether a collision with a door portion has occurred, whereupon unnecessary operations of the airbag apparatus can be prevented.

Although the first embodiment is described in conjunction with the case where the integration execution portion 12 starts the integration of the acceleration GR when the acceleration GR is greater than or equal to the first threshold value GSH1, or is less than or equal to the second threshold value GSH2, the integration execution portion 12 may start integrating the acceleration GR when a condition different from the foregoing conditions is satisfied. For example, the integration execution portion 12 may start integrating the acceleration GR in the case where the absolute value of the acceleration GR is greater than or equal to a predetermined threshold value.

Besides, it is determined that an object has collided with a side surface of the vehicle VC, only in the case where the detected acceleration GR is greater than or equal to the third threshold value GSH3 and where the found integral of acceleration (=the velocity V) is greater than or equal to the fourth threshold value VSH. Therefore, by setting the third threshold value GSH3 and the fourth threshold value VSH at proper values, it is possible to prevent a false determination that an object has collided with a side surface of the vehicle VC, for example, when the vehicle VC is traveling on a rough road, or when a door is closed hard, or the like. Therefore, a collision with a door portion can be even more accurately determined, whereupon an unnecessary operation of the airbag apparatus can be certainly prevented.

Although the first embodiment is described in conjunction with the case where the collision determination portion 13 determines that an object has collided with a side surface of the vehicle VC only when the acceleration GR is greater than or equal to the third threshold value GSH3 and the velocity V is greater than or equal to the fourth threshold value VSH, it suffices that the collision determination portion 13 determines that an object has collided with a side surface of the vehicle VC on the basis of the acceleration GR and the velocity V. For example, the collision determination portion 13 may determine that an object has collided with a side surface of the vehicle VC provided that the acceleration GR is such a large value (>the third threshold value GSH3+α, where cc is a positive value) as to be unlikely to be produced except by a collision, in addition to that the acceleration GR is greater than or equal to the third threshold value GSH3 and the velocity V is greater than or equal to the fourth threshold value VSH. In this case, it can be even more accurately determined whether a collision with a door portion of the vehicle has occurred.

Figure 9:
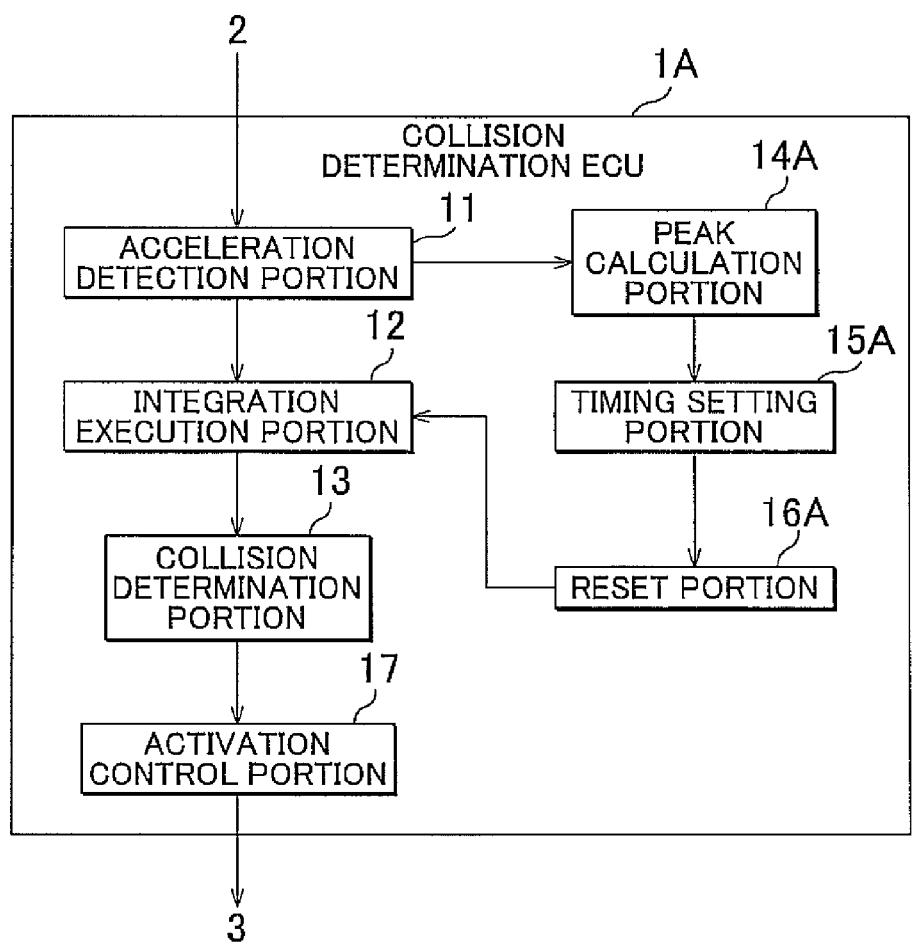
FIG. 9 is a block diagram showing an example of a functional construction of a collision determination ECU in accordance with a second embodiment of the invention.

FIG. 9 is a block diagram showing an example of a functional construction of a collision determination ECU 1A in accordance with a second embodiment of the invention. As shown in FIG. 9, the collision determination ECU 1A includes an acceleration detection portion 11, an integration execution portion 12, a collision determination portion 13, a peak calculation portion 14A, a timing setting portion 15A, a reset portion 16A, and an activation control portion 17. That is, the collision determination ECU 1A in accordance with the second embodiment is different from the collision determination ECU 1 in accordance with the first embodiment shown in FIG. 2, in that the ECU 1A includes the period calculation portion 14, the timing setting portion 15, the reset portion 16, the peak calculation portion 14A, the timing setting portion 15A and the reset portion 16A. In the following description, constructions of the collision determination ECU 1A in accordance with the second embodiment which are the same as those of the collision determination ECU 1 in accordance with the first embodiment are denoted by the same reference numbers, and descriptions thereof will be omitted, and constructions of the collision determination ECU 1A which distinguish it from the collision determination ECU 1 in accordance with the first embodiment will mainly be described.

Incidentally, a collision detection apparatus in accordance with the invention corresponds to the acceleration detection portion 11, the integration execution portion 12, the collision determination portion 13, the peak calculation portion 14A, the timing setting portion 15A and the reset portion 16A of the collision determination ECU 1A. An activation control apparatus for an occupant protection apparatus in accordance with the invention corresponds to the acceleration detection portion 11, the integration execution portion 12, the collision determination portion 13, the peak calculation portion 14A, the timing setting portion 15A, the reset portion 16A and the activation control portion 17 of the collision determination ECU 1A.

Besides, the collision determination ECU 1A causes a microcomputer disposed at an appropriate location in the collision determination ECU 1A to function as the acceleration detection portion 11, the integration execution portion 12, the collision determination portion 13, the peak calculation portion 14A, the timing setting portion 15A, the reset portion 16A, the activation control portion 17, etc., by causing the microcomputer to execute control programs that are pre-stored in a ROM or the like that is disposed at an appropriate location in the collision determination ECU 1A.

The peak calculation portion 14A finds a negative peak value GP of the acceleration GR detected by the acceleration detection portion 11.

The timing setting portion 15A sets a reset timing that is a timing of resetting to zero the value of the velocity V held by the integration execution portion 12, on the basis of a negative peak value GP of the acceleration GR found by the peak calculation portion 14A (i.e., a peak value of the acceleration in a direction from the inside toward the outside of a door portion of the vehicle VC). Concretely, the timing setting portion 15A sets the reset timing at a late timing as the absolute value GPA of the peak value GP (see FIG. 12) increases. In this example, the timing setting portion 15A sets a threshold value period PSH that prescribes the reset timing according to the absolute value GPA of the peak value GP, and also sets the reset timing at a time point at which the threshold value period PSH elapses from the time point of the occurrence of the peak value GP (see FIG. 12).

Figure 12:
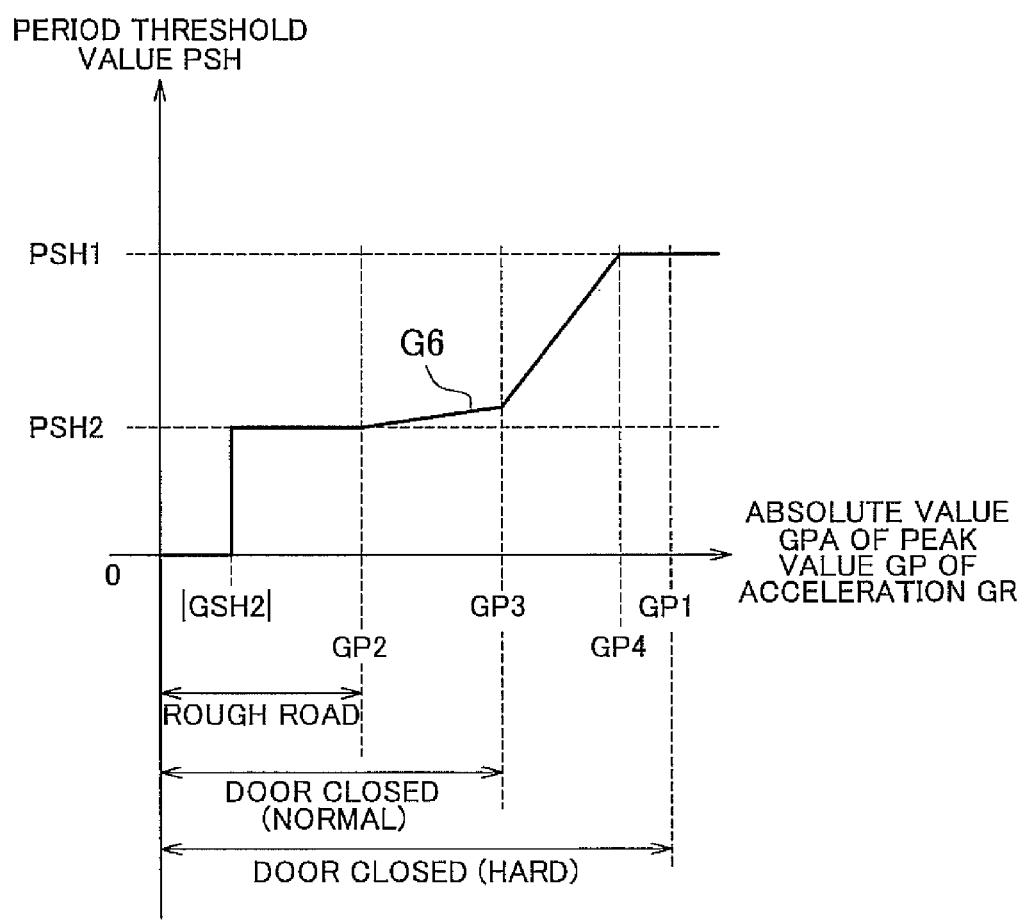
FIG. 12 is a graph showing an example of a method of setting a period threshold value PSH.

FIG. 12 is a graph showing an example of a method in which the period threshold value PSH is set by the timing setting portion 15A. In FIG. 12, the horizontal axis shows the absolute value GPA of the negative peak value GP of the acceleration GR found by the peak calculation portion 14A, and the vertical axis shows the period threshold value PSH set by the timing setting portion 15A. A graph G6 in FIG. 12 shows a relation between the period threshold value PSH set by the timing setting portion 15A and the absolute value GPA of the negative peak value GP of the acceleration GR found by the peak calculation portion 14A. The following description will be made in conjunction with the case where the absolute value of the first threshold value GSH1 is larger than the absolute value of the second threshold value GSH2, for the sake of convenience in description.

As shown by the graph G6 in FIG. 12, in the case where the absolute value GPA of the peak value GP is less than or equal to the absolute value of the second threshold value GSH2, the integration of the acceleration GR is not started by the integration execution portion 12, and therefore the period threshold value PSH is not set. In the case where the absolute value GPA of the peak value GP is greater than or equal to the absolute value of the second threshold value GSH2 and is less than or equal to a pre-set absolute value GP2 (>the absolute value of the second threshold value GSH2), a pre-set period threshold value PSH2 is set as the period threshold value PSH. Besides, in the case where the absolute value GPA of the peak value GP is larger than the absolute value GP2 and is less than or equal to a pre-set absolute value GP3 (>the absolute value GP2), the period threshold value PSH is gently increased. Furthermore, in the case where the absolute value GPA of the absolute value GP is larger than the absolute value GP3 and is less than or equal to a pre-set absolute value GP4 (>the absolute value GP3), the period threshold value PSH is sharply increased. Then, when the absolute value GPA of the peak value GP is greater than or equal to the absolute value GP4, the period threshold value PSH is set at a pre-set period threshold value PSH1 (>PSH2).

The absolute value GP2 herein is a maximum value of the absolute value of the peak value GP that occurs when the vehicle VC travels on a rough road. Besides, the absolute value GP3 is a maximum value of the absolute value of the peak value GP that occurs when a door of the vehicle VC is closed with ordinary force. Furthermore, the absolute value GP1 is a maximum value of the absolute value of the peak value GP that occurs when a door of the vehicle VC is closed hard (at the time of hard closure of a door).

Referring back to FIG. 9, the functional construction of the collision determination ECU 1A will be described. The reset portion 16A resets to zero the value of the velocity V held by the integration execution portion 12, at the reset timing set by the timing setting portion 15A.

Figure 10:
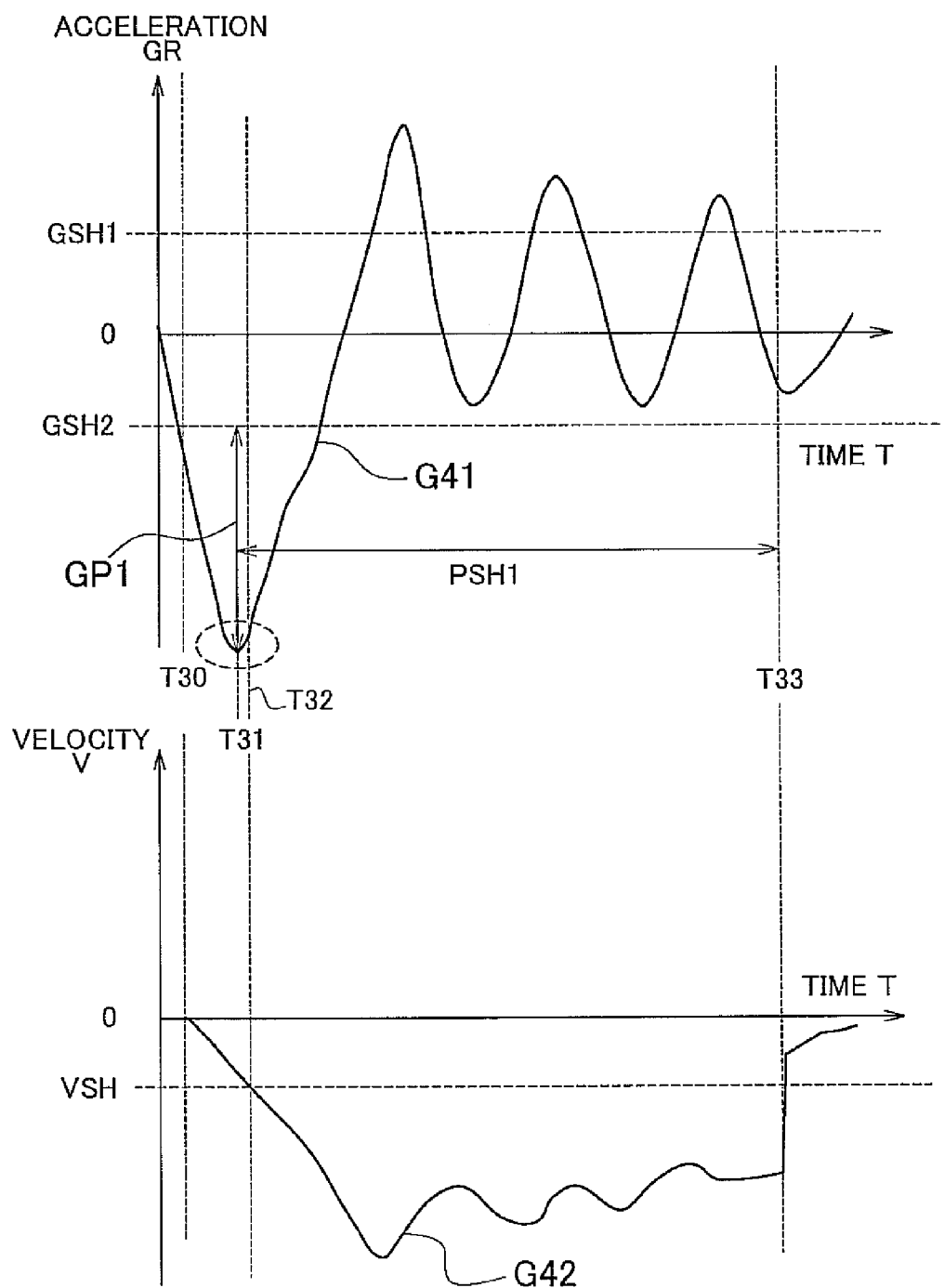
FIG. 10 is a graph showing an example of the timing of resetting an integral of acceleration.
Figure 11:
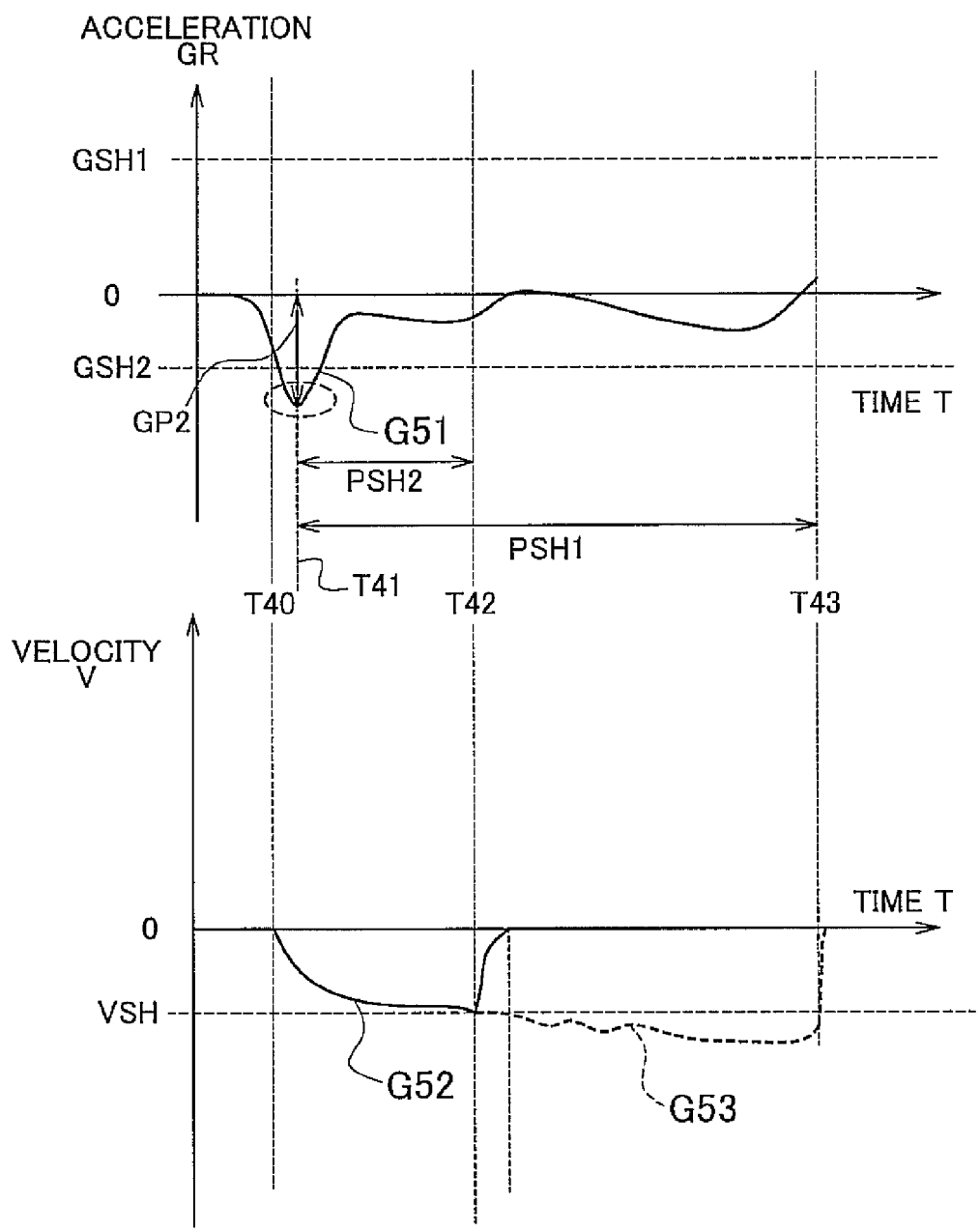
FIG. 11 is a graph showing another example of the timing of resetting an integral.

FIGS. 10 and 11 are graphs showing examples of the reset timing for the integral of acceleration (=the velocity V) which are set by the reset portion 16A. FIG. 10 is a graph for the case where a door is closed hard, and FIG. 11 is a graph for the case where the vehicle VC is traveling on a rough road. Besides, in FIGS. 10 and 11, the upper diagrams are graphs G41 and G51, respectively, that show the acceleration GR detected by the acceleration detection portion 11, and the lower diagrams are graphs G42 and G52, respectively, that show the integral of acceleration (=the velocity V) found by the integration execution portion 12. In all the diagrams, the horizontal axis shows time T.

As shown by the upper diagram in FIG. 10, at a time point T30, the acceleration GR becomes less than or equal to the second threshold value GSH2, and therefore the integration execution portion 12 starts the integration process. Then, at a time point T31, the peak calculation portion 14A finds the absolute value GP1 of a peak value of the acceleration GR. On the basis of the absolute value GP1 of the peak value thus found, the timing setting portion 15A sets the period threshold value PSH to the period threshold value PSH1. Besides, as shown by the lower diagram in FIG. 10, at a time point T32, the integral of acceleration (=the velocity V) becomes less than or equal to the fourth threshold value VSH, and therefore the activation control portion 17 prohibits activation (i.e., deployment) of the airbag apparatus. Then, at a time point T33 (=reset timing) at which the period threshold value PSH1 elapses from the time point T31, the integral of acceleration (=the velocity V) is reset.

Likewise, as shown by the upper diagram in FIG. 11, at a time point T40, the acceleration GR becomes less than or equal to the second threshold value GSH2, and therefore the integration execution portion 12 starts the integration process. Then, at a time point T41, the peak calculation portion 14A finds the absolute value GP2 of a peak value of the acceleration GR. On the basis of the absolute value GP2 of the peak value found, the timing setting portion 15A sets the period threshold value PSH at the period threshold value PSH2. Then, at a time point T42 (=reset timing) at which the period threshold value PSH2 elapses from the time point T41, the integral of acceleration (=the velocity V) is reset.

Incidentally, in the diagram in FIG. 11, a graph G53 shown by an interrupted line shows changes in the integral of acceleration (=the velocity V) occurring in the case where the period threshold value PSH is set at the period threshold value PSH1 as shown in FIG. 10. Specifically, if in the case where the vehicle VC is traveling on a rough road, the reset timing is set at the period threshold value PSH1 that is the reset timing set when the door is closed hard, there arises a period (from the time point T42 to the time point T43) during which the velocity V becomes less than or equal to the fourth threshold value VSH and the activation control portion 17 prohibits activation (i.e., deployment) of the airbag apparatus.

Thus, for example, when the vehicle travels on a rough road and when a door is closed hard, the larger the absolute value GPA of the negative peak value GP of the detected acceleration GR, the longer the acceleration GR caused by a rough road surface or by the hard closure of the door continues. Therefore, if the period threshold value PSH is set longer (i.e., the reset timing is more retarded) the larger the absolute value GPA of the peak value is, the reset timing can be set at proper timing.

Although the second embodiment has been described above in conjunction with the construction in which the timing setting portion 15A sets the reset timing at a timing that is later the larger the absolute value GPA of the negative peak value GP of the acceleration GR is, it suffices that the timing setting portion 15A sets the reset timing on the basis of the acceleration GR. For example, the timing setting portion 15A may set the reset timing at a time at which a pre-set reset period elapses, when the acceleration GR becomes less than or equal to a pre-set threshold value (<the second threshold value GSH2). In this construction, the process is simplified.

Figure 13:
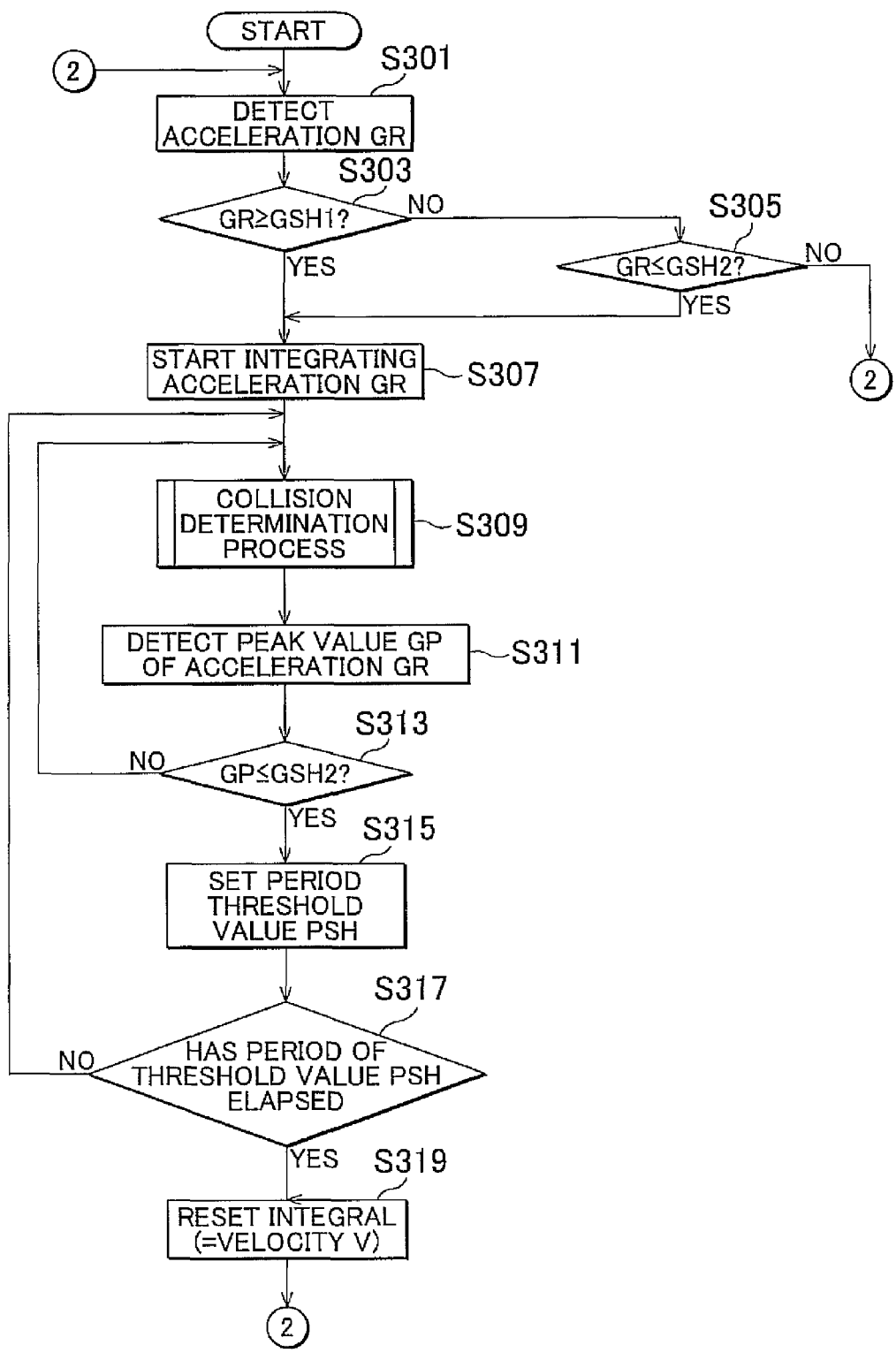
FIG. 13 is a flowchart showing an example of actions of the collision determination ECU in accordance with the second embodiment.

FIG. 13 is a flowchart showing an example of actions of the collision determination ECU 1A in accordance with the second embodiment. Firstly, the acceleration detection portion 11 of the collision determination ECU 1A detects the acceleration GR via the acceleration sensors 21 and the LPF 22 (S301). Then, the integration execution portion 12 determines whether the acceleration GR detected in step S301 is greater than or equal to the positive first threshold value GSH1 (S303). If it is determined that the acceleration GR is greater than or equal to the first threshold value GSH1 (YES in S303), the process proceeds to step S307. If it is determined that the acceleration GR is less than the first threshold value GSH1, the integration execution portion 12 determines whether the acceleration GR detected in step S301 is less than or equal to the negative second threshold value GSH2 (S305). If it is determined that the acceleration GR is less than or equal to the negative second threshold value GSH2 (YES in S305), the process proceeds to step S307. If it is determined that the acceleration GR is greater than the second threshold value GSH2 (NO in S305), the process returns to step S301. Thus, the process starting with step S301 is repeated.

If the answer to step S303 is YES or if the answer to step S305 is YES, the integration execution portion 12 starts integration of the acceleration GR and finds an integral thereof (=the velocity V) (S307). Then, using the collision determination portion 13 and the like, the collision determination ECU 1A performs a collision determination process that is a process of determining whether an object has collided with a side surface of the vehicle VC (S309). Next, the acceleration detection portion 11 detects the acceleration GR via the acceleration sensors 21 and the LPF 22, and the peak calculation portion 14A finds a peak value GP of the acceleration GR (S311). Next, the timing setting portion 15A determines whether the peak value GP is less than or equal to the negative second threshold value GSH2 (S313).

If it is determined that the peak value GP is greater than the negative second threshold value GSH2 (NO in S313), the process returns to step S309. Thus, the process starting with step S309 is repeated. If the peak value GP is less than or equal to the second threshold value GSH2 (YES in S313), the timing setting portion 15A sets a threshold value period PSH on the basis of the absolute value GPA of the peak value GP found in step S311 (S315). Then, the reset portion 15A determines whether the threshold value period PSH set in step S315 has elapsed following the time point of occurrence of the peak value GP (S317). If it is determined that the threshold value period PSH has not elapsed (NO in S317), the process returns to step S309. Thus, the process starting with step S309 is repeated. If it is determined that the threshold value period PSH has elapsed (YES in S317), the reset portion 16A resets the integral of acceleration (=the velocity V) (S319). After that, the process returns to step S301. Thus, the process starting with step S301 is repeated.

Thus, since the value of the integral of acceleration (the velocity V) is reset to zero at the pre-set reset timing, the proper setting of the reset timing will prevent the adverse effect of the integral of the acceleration GR (=the velocity V) resulting from a travel on a rough road surface, hard closure of a door, etc. at the time of determining whether a collision has occurred. Therefore, the foregoing construction makes it possible to even more accurately determine whether a collision with a door portion of the vehicle has occurred.

Besides, for example, when the vehicle travels on a rough road and when a door is closed hard, the acceleration GR caused by a rough road surface or the hard closure of the door continues longer the larger the absolute value of the detected acceleration GR is. Therefore, if the reset timing is more retarded the larger the absolute value GPA of the peak value is, the reset timing can be set at proper timing.

Incidentally, the collision detection apparatus and the activation control apparatus for an occupant protection apparatus of the invention are not limited to the foregoing embodiments, but may also be provided in other constructions including the following constructions. Although in the first embodiment, the collision determination ECU 1 functionally includes the acceleration detection portion 11, the integration execution portion 12, the collision determination portion 13, the period calculation portion 14, the timing setting portion 15, the reset portion 16, the activation control portion 17, etc., it is also permissible to adopt a construction in which at least one of the acceleration detection portion 11, the integration execution portion 12, the collision determination portion 13, the period calculation portion 14, the timing setting portion 15, the reset portion 16 and the activation control portion 17 is realized in hardware, for example, as an electric circuit or the like.

Likewise, although in the second embodiment, the collision determination ECU 1A includes the acceleration detection portion 11, the integration execution portion 12, the collision determination portion 13, the peak calculation portion 14A, the timing setting portion 15A, the reset portion 16A, the activation control portion 17, etc., it is also permissible to adopt a construction in which at least one of the acceleration detection portion 11, the integration execution portion 12, the collision determination portion 13, the peak calculation portion 14A, the timing setting portion 15A, the reset portion 16A and the activation control portion 17 is realized in hardware, for example, as an electric circuit or the like.

Although in the first and second embodiments the occupant protection apparatus is the airbag apparatus, the occupant protection apparatus may also be of other kinds (e.g., an occupant protection apparatus that tightens a seat belt, and the like).

Although in the first and second embodiments, the acceleration detection portion 11 detects the acceleration GR via the acceleration sensors 21 and the LPF 22, the acceleration detection portion 11 may also detect the acceleration GR via a plurality of acceleration sensors that are disposed in each of the doors. For example, in a vehicle VC, each door may be provided with two acceleration sensors that are disposed at forward side and a rearward side, and the acceleration detection portion 11 may detect the acceleration GR via the two acceleration sensors of each door. Concretely, the acceleration detection portion 11 may detect as the acceleration GR an average of the values detected by the two acceleration sensors (or one of the detected values whose absolute value is the greater), or the like. In this construction, it can be even more accurately determined whether a collision has occurred.

The invention is applicable to, for example, a collision detection apparatus that is mounted in a vehicle and that determines whether an object has collided with a side surface of the vehicle from outside. Besides, the invention is also applicable to, for example, an activation control apparatus for an occupant protection apparatus which is mounted in a vehicle, and which determines whether an object has collided with a side surface of the vehicle from outside, and which accordingly controls the activation of the occupant protection apparatus.

What is claimed is:

1. A collision detection apparatus that is mounted in a vehicle and that determines whether an object has collided with a side surface of the vehicle from outside the vehicle, comprising:
an acceleration detection portion that detects acceleration in a transverse direction of the vehicle which is applied to a door portion of the vehicle from outside the vehicle;
an integration execution portion that starts integration of the acceleration detected by the acceleration detection portion, the integration execution portion compares the acceleration detected by the acceleration detection portion to one of a pre-set positive threshold value or a pre-set negative threshold value and when the acceleration detected by the acceleration detection portion fails to exceed the pre-set positive threshold value or fails to fall below the pre-set negative threshold the integration execution portion compares the acceleration detected by the acceleration detection portion to the other of the pre-set positive threshold value or the pre-set negative threshold value, the integration execution portion only finds velocity by integrating the acceleration when the acceleration detected by the acceleration detection portion exceeds the pre-set positive threshold value or falls below the pre-set negative threshold value; and
a collision determination portion that determines whether the object has collided with the side surface of the vehicle based on the acceleration detected by the acceleration detection portion and the velocity found by the integration execution portion.

2. The collision detection apparatus according to claim 1, wherein:
the acceleration detection portion detects positive value as the acceleration if the acceleration is applied in a direction from an outside of the door portion to an inside of the door portion; and
the collision determination portion determines that an object has collided with the side surface of the vehicle only when the acceleration detected by the acceleration detection portion is greater than or equal to a pre-set positive third threshold value and the velocity found by the integration execution portion is greater than or equal to a pre-set fourth threshold value.

3. The collision detection apparatus according to claim 1, further comprising
a reset portion that resets value of the velocity held by the integration execution portion to zero at a pre-set reset timing.

4. The collision detection apparatus according to claim 3, further comprising
a timing setting portion that sets the reset timing based on the acceleration detected by the acceleration detection portion.

5. The collision detection apparatus according to claim 4, wherein the timing setting portion sets the reset timing based on a peak value of the acceleration in a direction from an outside of the door portion to an inside of the door portion which is detected by the acceleration detection portion.

6. The collision detection apparatus according to claim 5, wherein the timing setting portion sets the reset timing to a later timing as an absolute value of the peak value detected by the acceleration detection portion increases.

7. The collision detection apparatus according to claim 4, further comprising
a period calculation portion that finds length of a period that satisfies a condition that the acceleration detected by the acceleration detection portion continues to fail to exceed the pre-set positive threshold value or fail to fall below the pre-set negative threshold value, wherein
the timing setting portion sets the reset timing at a timing at which the length of the period found by the period calculation portion becomes equal to a pre-set period threshold value.

8. The collision detection apparatus according to claim 7, wherein the acceleration detection portion detects the acceleration via an acceleration sensor that is disposed on a door inner panel of the door portion.

9. The collision detection apparatus according to claim 8, wherein the period threshold value is set based on a resonance period of the door inner panel.

10. The collision detection apparatus according to claim 1, wherein the acceleration detection portion detects the acceleration via an acceleration sensor that is disposed on a door inner panel of the door portion.

11. The collision detection apparatus according to claim 10, wherein the acceleration detection portion detects the acceleration after removing a high-frequency component from a detection signal of the acceleration sensor.

12. The collision detection apparatus according to claim 11, wherein the acceleration detection portion removes the high-frequency component from the detection signal of the acceleration sensor, via a low-pass filter.

13. An activation control apparatus for an occupant protection apparatus which is mounted in a vehicle, and which determines whether an object has collided with a side surface of the vehicle from outside, and which controls activation of the occupant protection apparatus, the activation control apparatus comprising:
an acceleration detection portion that detects acceleration in a transverse direction of the vehicle which is applied to a door portion of the vehicle from outside the vehicle;
an integration execution portion that starts integration of the acceleration detected by the acceleration detection portion, the integration execution portion compares the acceleration detected by the acceleration detection portion to one of a pre-set positive threshold value or a pre-set negative threshold value and when the acceleration detected by the acceleration detection portion fails to exceed the pre-set positive threshold value or fails to fall below the pre-set negative threshold the integration execution portion compares the acceleration detected by the acceleration detection portion to the other of the pre-set positive threshold value or the pre-set negative threshold value, the integration execution portion only finds velocity by integrating the acceleration when the acceleration detected by the acceleration detection portion exceeds the pre-set positive threshold value or falls below the pre-set negative threshold value; and
a collision determination portion that determines whether the object has collided with the side surface of the vehicle based on the acceleration detected by the acceleration detection portion and the velocity found by the integration execution portion; and
an activation prohibition portion that prohibits activation of the occupant protection apparatus if it is determined by the collision determination portion that the object has not collided with the side surface of the vehicle.

14. The activation control apparatus for the occupant protection apparatus according to claim 13, wherein:
the acceleration detection portion detects positive value as the acceleration if the acceleration is applied in a direction from an outside of the door portion to an inside of the door portion; and
the collision determination portion determines that the object has collided with the side surface of the vehicle only when the acceleration detected by the acceleration detection portion is greater than or equal to a pre-set positive third threshold value and the velocity found by the integration execution portion is greater than or equal to a pre-set fourth threshold value.

15. A collision determination method that determines whether an object has collided with a side surface of a vehicle from outside the vehicle, comprising:
detecting acceleration in a transverse direction of the vehicle which is applied to a door portion of the vehicle from outside the vehicle;
comparing the detected acceleration to one of a pre-set positive threshold value or a pre-set negative second threshold value and when the detected acceleration fails to exceed the pre-set positive threshold value or fails to fall below the pre-set negative threshold value, comparing the detected acceleration to the other of the pre-set positive threshold value or the pre-set negative threshold value;
starting integration of the detected acceleration and finding velocity by integrating the acceleration only if the detected acceleration exceeds the pre-set positive threshold value, or falls below the pre-set negative threshold value; and determining whether the object has collided with the side surface of the vehicle based on the detected acceleration and the velocity.

\* \* \* \* \*